(12) United States Patent
Suarez-Rivera et al.

(10) Patent No.: US 8,200,465 B2
(45) Date of Patent: Jun. 12, 2012

(54) HETEROGENEOUS EARTH MODELS FOR A RESERVOIR FIELD

(75) Inventors: Roberto Suarez-Rivera, Salt Lake City, UT (US); David Handwerger, Salt Lake City, UT (US); Timothy Sodergren, Murray, UT (US); Yi-Kun Yang, Salt Lake City, UT (US)

(73) Assignee: TerraTek Inc., Salt Lake City, UT (US)

( * ) Notice: Subject to any disclaimer, the term of this patent is extended or adjusted under 35 U.S.C. 154(b) by 417 days.

(21) Appl. No.: 12/474,323

(22) Filed: May 29, 2009

(65) Prior Publication Data
US 2009/0319243 A1    Dec. 24, 2009

Related U.S. Application Data

(60) Provisional application No. 61/073,760, filed on Jun. 18, 2008.

(51) Int. Cl.
G06G 7/48 (2006.01)
(52) U.S. Cl. .......................................... 703/10
(58) Field of Classification Search ...................... 703/10
See application file for complete search history.

(56) References Cited

U.S. PATENT DOCUMENTS

| 6,829,570 | B1 | 12/2004 | Thambynayagam |
| 6,950,786 | B1 * | 9/2005 | Sonneland et al. ............... 703/2 |
| 2007/0168133 | A1 | 7/2007 | Bennett |
| 2008/0004847 | A1 * | 1/2008 | Bradford ......................... 703/10 |
| 2008/0068928 | A1 | 3/2008 | Duncan |
| 2008/0130407 | A1 | 6/2008 | Akhtar |
| 2009/0119076 | A1 * | 5/2009 | Madatov et al. .................. 703/2 |

* cited by examiner

*Primary Examiner* — Dwin M Craig
*Assistant Examiner* — Andre Pierre Louis
(74) *Attorney, Agent, or Firm* — Robert P. Lord; Wayne I. Kanak

(57) ABSTRACT

A method for creating a heterogeneous earth model (HEM) of a reservoir field includes generating a group of wellsite models for a group of wellsites of the reservoir field based at least on cluster analysis and cluster tagging performed on log data of the group of wellsites, generating a reference model from the group of wellsite models, where cluster tagging errors of the group of wellsite models is minimized to obtain the reference model, constructing a contour plot of the cluster tagging errors on a cluster by cluster basis in the reservoir field, identifying at least one well location and associated core depth interval based on the contour plot for obtaining additional sampling results, and updating the reference model based on the additional sampling results to create the HEM.

24 Claims, 17 Drawing Sheets

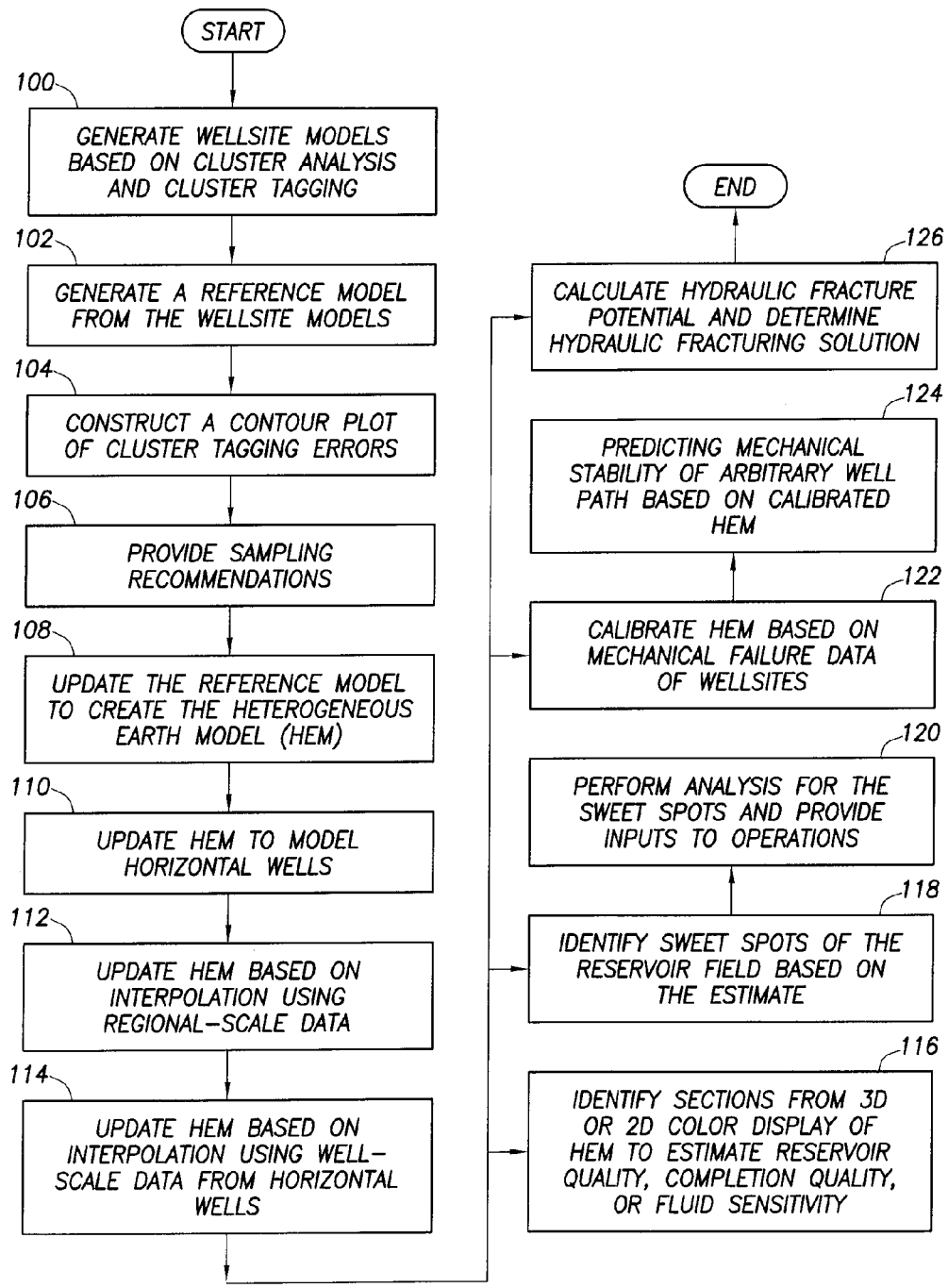
FIG.1.1

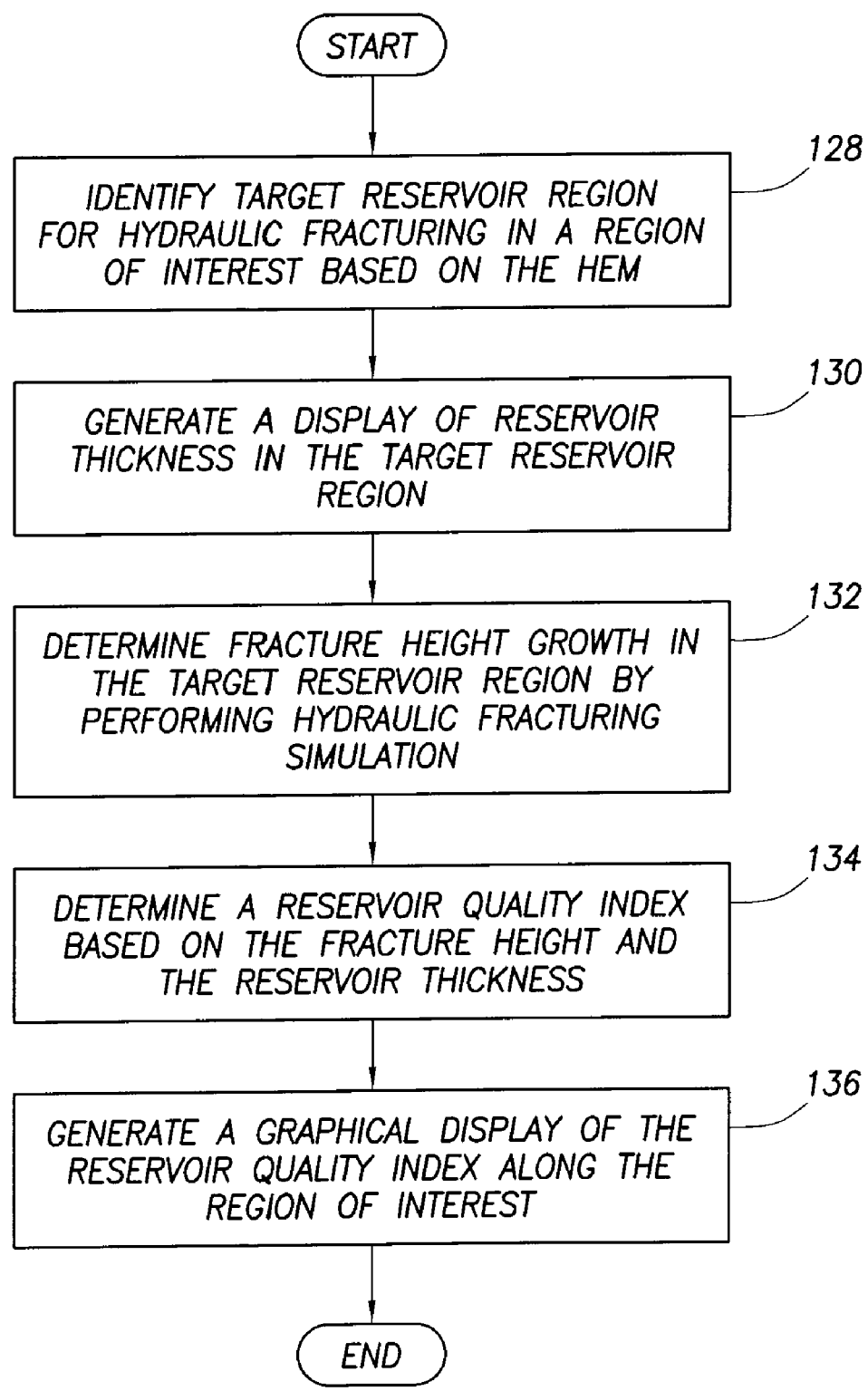
FIG.1.2

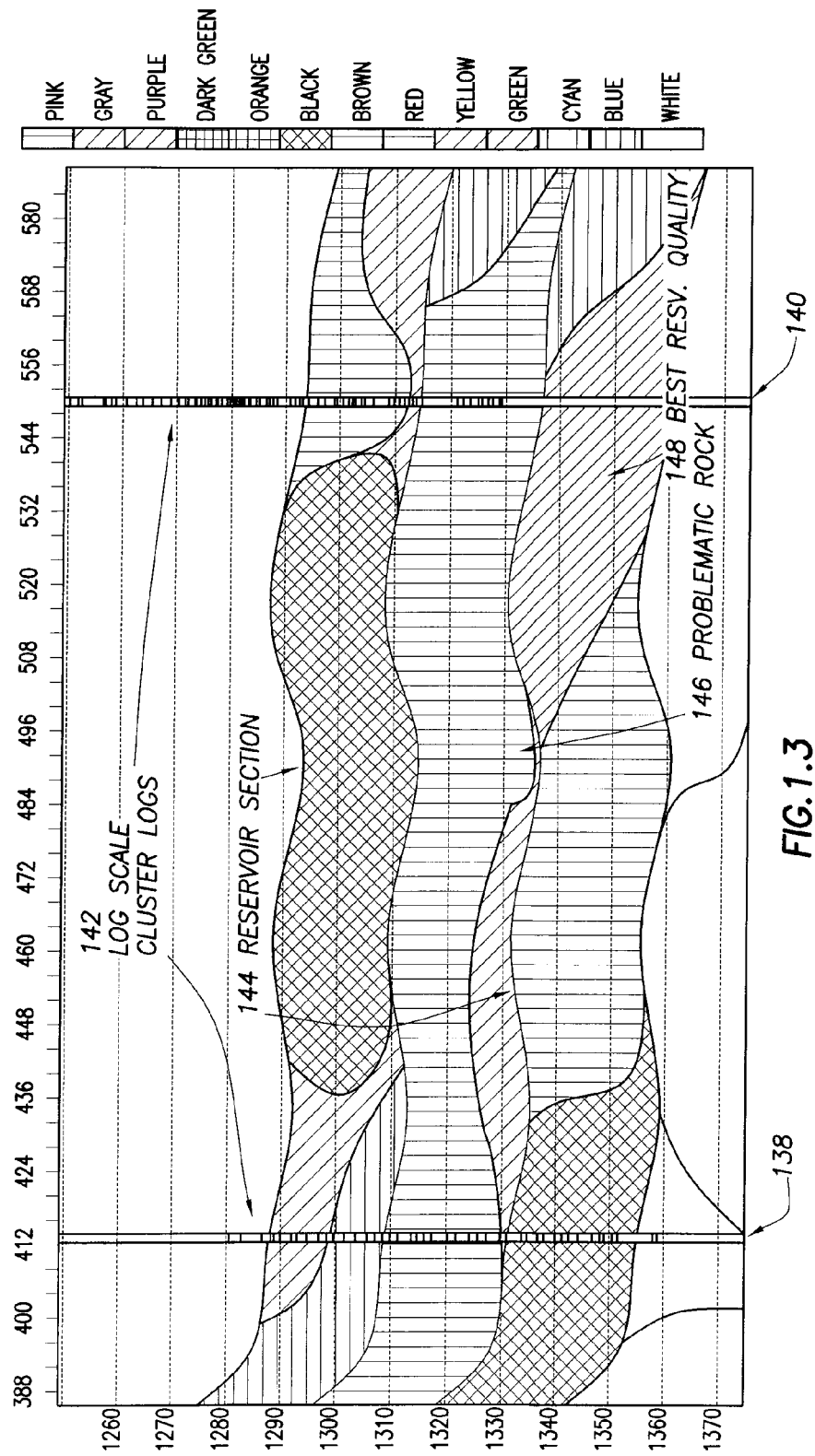
FIG.1.3

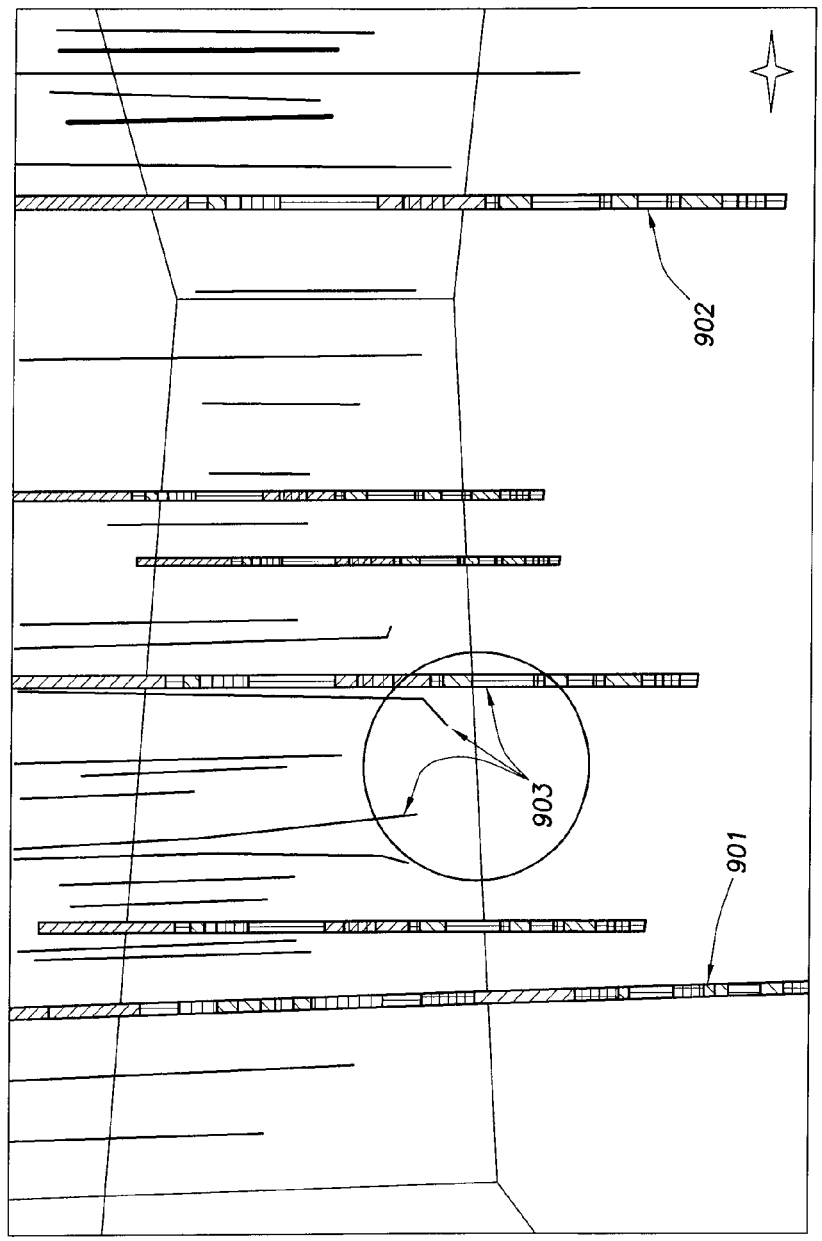
FIG.9.1

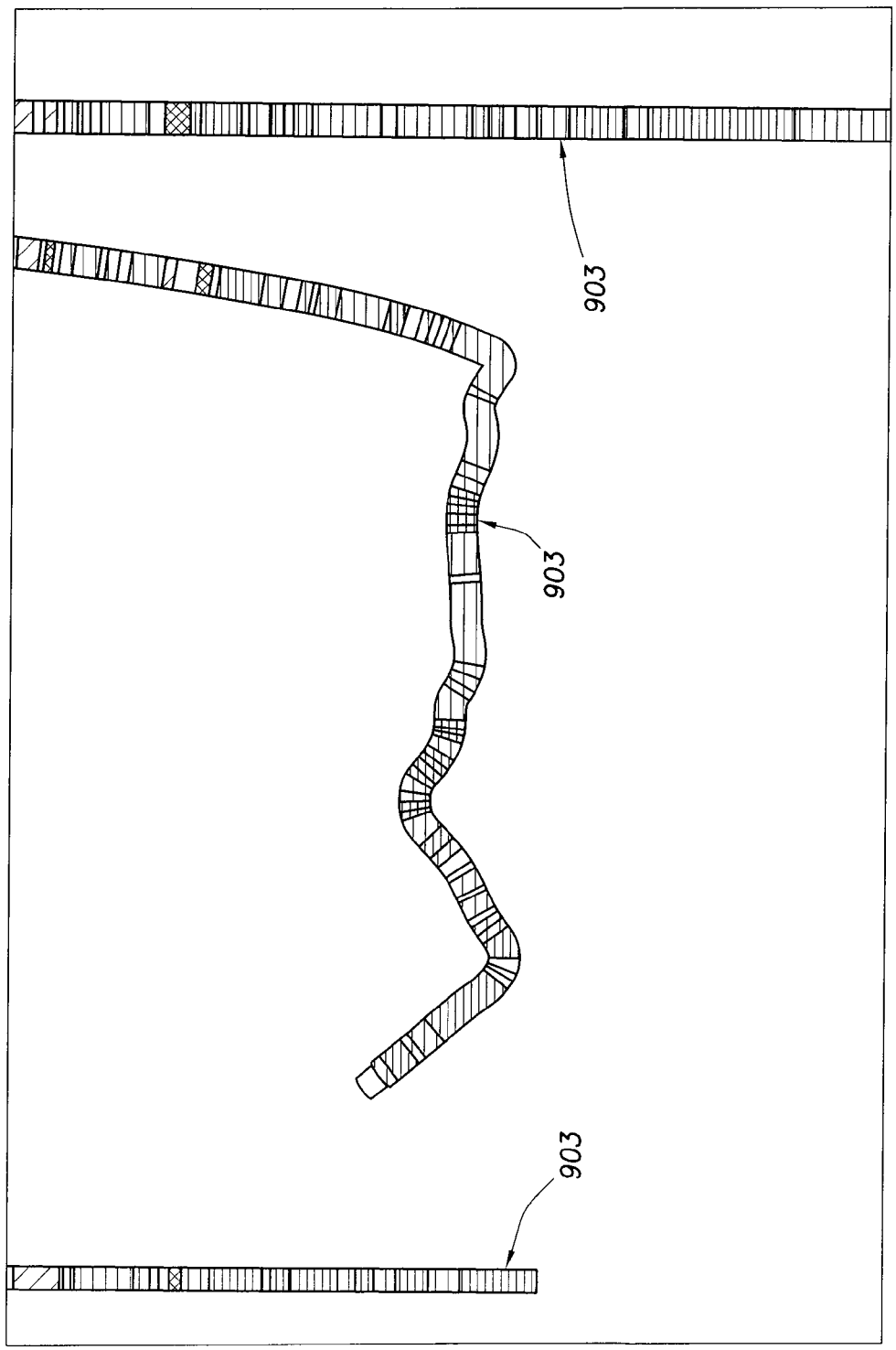
FIG.9.2

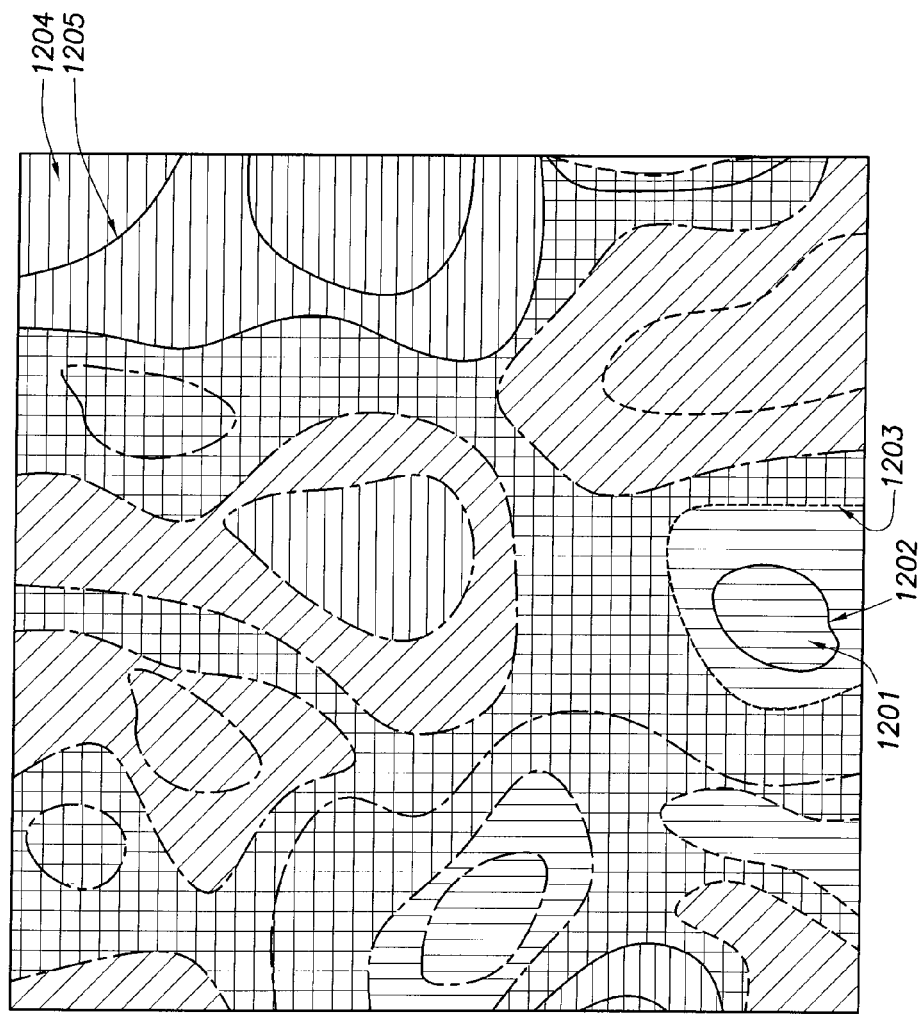
FIG. 12
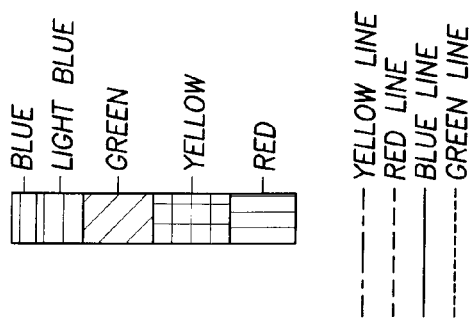

HETEROGENEOUS EARTH MODELS FOR A RESERVOIR FIELD

CROSS-REFERENCE TO RELATED APPLICATIONS

This application claims priority pursuant to 35 U.S.C. §119(e) to U.S. Provisional Patent Application No. 61/073,760 entitled "Method and System for Heterogeneous Earth Models for Optimizing Exploration and Production" and filed Jun. 18, 2008, the entire contents of which is incorporated by reference herein by reference.

The present application contains subject matter that may be related to subject matter contained in U.S. patent application Ser. No. 12/417,694, entitled "Continuous Measurement of Heterogeneity of Geomaterials," filed Apr. 3, 2009, the entire contents of which is incorporated herein by reference.

The present application contains subject matter that may be related to subject matter contained in U.S. patent application Ser. No. 12/417,725, entitled "Apparatus for Continuous Measurement of Heterogeneity of Geomaterials," filed Apr. 3, 2009, the entire contents of which is incorporated herein by reference.

The present application contains subject matter that may be related to subject matter contained in U.S. Provisional Patent Application No. 61/045,468 entitled "Method and System for Continuous Measurement of Heterogeneity for Scaling from Micro to Large Scale," filed Apr. 16, 2008, the entire contents of which is incorporated by reference herein by reference. Both U.S. patent application Ser. Nos. 12/417,694 and 12/417,725 claim priority to the filing date of U.S. Provisional Patent Application No. 61/045,468.

The present application contains subject matter that may be related to subject matter contained in U.S. patent application Ser. No. 11/617,993, entitled "Method and Apparatus for Multi-dimensional Data Analysis to Identify Rock Heterogeneity," filed Dec. 29, 2006, the entire contents of which are incorporated herein by reference.

BACKGROUND

Natural resources are extracted from reservoir fields in sedimentary formations that evolved as a result to multiple processes occurring over geologic times. These may include basin formation and development, accumulation of sediments, compaction and cementation, and post depositional processes (e.g., digenesis, compaction, cementation, dewatering) that resulting in regional or local alterations of material properties. These processes may also include cycles of tectonic loading and deformation, which may result in fracturing, pore pressure buildup or release, and stress development. In addition, there may also be effects associated to changes in pressure, temperature and the flow of fluids, including clay and kerogen maturation, generation and flow of hydrocarbons (e.g., gas and oil), water displacement, and mineralization of fractures, pores, and open interfaces. This results in a complex sedimentary system composed of interbedded lithofacies, whose properties may vary with location and with orientation to bedding. Furthermore, if the digenetic overprint is strong, the distribution of material properties may be weakly related to the depositional system. Thus, understanding the geological history and structural architecture of the system may not be conducive to understanding the distribution of material properties within the basin.

Examples of hydrocarbon producing systems with strong digenetic overprint are tight gas shale reservoirs. Typically, tight gas shale reservoirs are massive mudstone accumulations, with relatively simple structure (e.g., flat and continuous beds), and composed by end-member argillaceous, siliceous, calcareous facies, and a number of transitional facies. Argillaceous facies are primarily depositional. Siliceous and calcareous result from digenetic alterations, and their presence and abundance is related to abundance of biologic sources for these minerals. The result is a system that may be initially considered as a simple layered reservoir (e.g., a layer cake system) but because of the strong digenetic overprint and its localized nature, it is soon recognized to be a strongly heterogeneous reservoir (e.g., raisins in the pudding system). In the analogy, the pudding is pervasive but of poor reservoir quality, the raisins are few and far in between, but of high reservoir quality. Thus, identifying and tracking the raisins from the pudding, becomes the principal goal of tight gas shale exploration.

SUMMARY

In general, in one aspect, the heterogeneous earth model (HEM) for a reservoir field relates to a method for creating a HEM of a reservoir field. The method includes generating a plurality of wellsite models for a plurality of wellsites of the reservoir field based at least on cluster analysis and cluster tagging performed on log data of the plurality of wellsites, generating a reference model from the plurality of wellsite models, wherein cluster tagging errors of the plurality of wellsite models is minimized to obtain the reference model, constructing a contour plot of the cluster tagging errors on a cluster by cluster basis in the reservoir field, identifying at least one well location and associated core depth interval based on the contour plot for obtaining additional sampling results, and updating the reference model based on the additional sampling results to create the HEM.

Other aspects will be apparent from the following description and the appended claims.

BRIEF DESCRIPTION OF DRAWINGS

FIGS. 1.1-1.2 show flow charts of a method in accordance with one or more embodiments.

FIG. 1.3 shows an example volumetric representation of the HEM in accordance with one or more embodiments.

FIGS. 9.1-9.2 show example three dimensional (3D) volumetric representations of the HEM in accordance with one or more embodiments.

FIGS. 11-12 show example two dimensional (2D) representations of the HEM in accordance with one or more embodiments.

DETAILED DESCRIPTION

Figure 2:
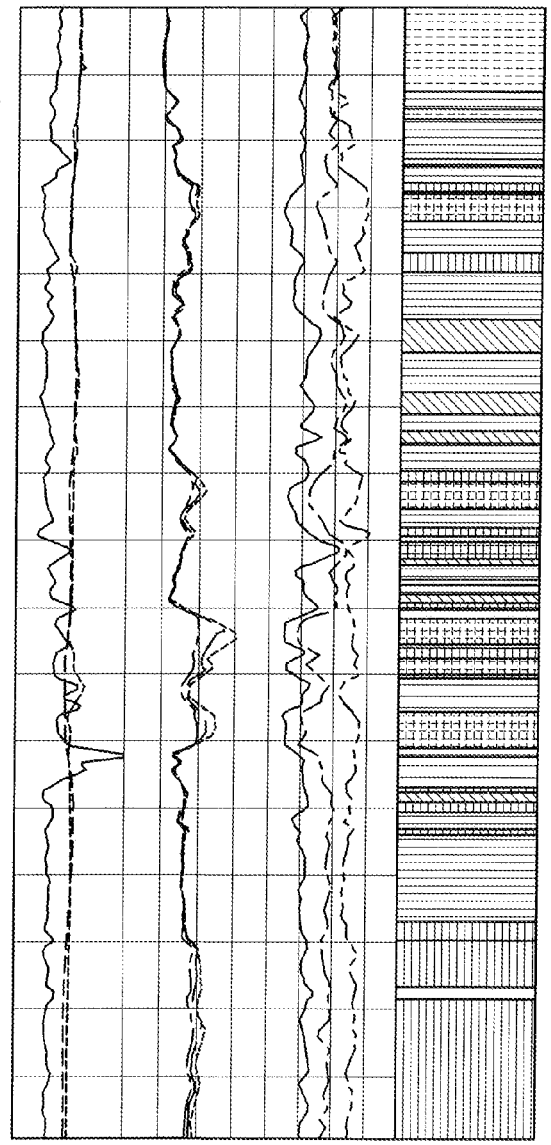
FIGS. 2-3 show graphical representations of cluster analysis in accordance with one or more embodiments.

Specific embodiments of the heterogeneous earth model (HEM) for a reservoir field will now be described in detail with reference to the accompanying figures. Like elements in the various figures are denoted by like reference numerals for consistency.

In the following detailed description of embodiments of the HEM for a reservoir field, numerous specific details are set forth in order to provide a more thorough understanding of the HEM for a reservoir field. However, it will be apparent to one of ordinary skill in the art that the HEM for a reservoir field may be practiced without these specific details. In other instances, well-known features have not been described in detail to avoid unnecessarily complicating the description.

In general, embodiments of the HEM for a reservoir field relate to a method and system for evaluating heterogeneous media with spatially varying material properties (e.g., texture, composition, and a number of relevant reservoir, mechanical, and geochemical properties including rock-fluid interactions, etc.). More specifically, the HEM for a reservoir field relates to a method and system for creating a HEM for modeling the behavior of geomaterials for excavations, mineral resource exploitation or production, analysis of underground storage, analysis of foundations for large-scale civil engineering projects and related activities, and/or other applicable activities benefiting from a heterogeneous earth model. In addition, the HEM for a reservoir field relates to a method and system to integrate data obtained at different scales, such as continuous and discrete data from wellbore-scale measurements, continuous and discrete data from regional-scale measurements, continuous and discrete data from core-scale data, etc. to provide a volumetric representation of the distribution of material properties at a well-scale and/or at a regional-scale. Further, embodiments of the HEM for a reservoir field uses volumetric regional-scale data (e.g., seismic, electro-magnetics, gravity), or volumetric geologic models to interpolate between wells for rendering the HEM. Furthermore, embodiments of the HEM for a reservoir field allow simultaneous monitoring of presence and variability of multiple properties (e.g., reservoir, geochemical and mechanical) across the region of interest, improve the resolution of the stratigraphic geologic model, and facilitate the interpretation of the results and provide direct input to engineering operations. For example, a grid model may be generated based on the HEM with volumetric continuity for use as input to high-end numerical analyses (e.g., reservoir modeling and mechanical modeling simulations, and structural basin reconstructions).

More specifically, by way of an example, the building of a HEM model is accomplished by (i) identifying rock units with similar and dissimilar material properties from well logs or equivalent well scale measurements (these are the principal building blocks of the model); (ii) tracking of these units vertically and laterally across the basin, independently to geologic constrains, using well logs or equivalent well scale measurements; and (iii) identifying and visualizing their presence, distribution, including changes in thickness and stacking patterns from well to well. This data is then interpolated using statistical techniques, to obtain volumetric representations of the heterogeneous model. When the number of monitoring wells (typically vertical) is limited or insufficient for adequate representation of the volumetric model, the methodology uses either regional-scale data (e.g., seismic measurements, gravity, magnetics, etc.), available geologic/stratigraphic models, and/or other well-scale data from production wells (typically horizontal and inclined wells), for interpolating cluster definitions obtained at wells, to regions between wells. The integration between regional-scale data (e.g., seismic, gravity) and well-scale data (e.g., well logs, mud logs, production logs), provides sufficient data for the development of a three dimensional heterogeneous earth model (3D HEM). In addition, once transforms for interpretation of well-scale data (i.e., logs) to regional-scale data (e.g., seismic) have been defined, the presence and distribution of building block units may be identified from these regional scale measurements, and their presence tracked across otherwise unexplored sections of the basin (without requiring well-scale data). This provides a level of control to hydrocarbon exploration and results in considerable savings.

Once the volumetric heterogeneous earth model is constructed, results are used for planning and operations related to exploration and production. For example, regions with highest combined reservoir and completion quality (i.e., the sweet spot regions) may be mapped. This information provides key data for estimation of producible reserves and for the strategic development of the reservoir field. This information also provides information for field development, such as identifying (i) easy targets (sweet spots), (ii) regions requiring technologic know-how, (iii) regions with no potential (given the current knowledge), etc. Further, the data may be used for planning well paths to effectively penetrate pay zones, for selecting perforation intervals (e.g., to minimize risk of sanding during production), and to optimize the number and location of perforation stages for hydraulic fracturing. In addition, the HEM may be coupled with large scale numerical simulators and provide the model geometry and material property definitions to be used for numerical simulations of long term production, well productivity, mechanical stability during drilling, long term mechanical stability during production (e.g., loss of fracture conductivity), and for minimizing risks. In addition, the HEM may be used for analyzing microseismic data during hydraulic fracturing and analyzing the retained fracture surface area during production after fracturing. By providing material properties that reflect more accurately the true behavior of heterogeneous reservoirs, the heterogeneous earth model allows better simulations, more accurate predictions, and directly impacts the economics of hydrocarbon exploration and production.

FIG. 1.1 shows a method in accordance with one embodiment of the HEM for a reservoir field. In one or more embodiments, one or more of the elements shown in FIG. 1.1 may be omitted, repeated, and/or performed in a different order. Accordingly, embodiments of the HEM for a reservoir field should not be considered limited to the specific arrangements of elements shown in FIG. 1.1.

In one or more embodiments, an areal extent (e.g., multiple sections, multiple counties, small scale, large scale, etc.) of a reservoir field is defined as the area of interest for developing a heterogeneous earth model (HEM). Existing data is collected and evaluated in the area of interest including existing regional studies (e.g., geologic, structural analysis, seismic analysis, geochemical, regional tectonic activity, etc.), regional scale data (e.g., seismic data including extent and type, gravity data, electromagnetic data, etc.), well scale data such as existing log data (e.g., number of wells, type or logs, log penetration) and well measurements (e.g., well production, reservoir pressure/temperature, fracture closure pressure, mud logs, drilling performance records, etc.), small scale (or sample scale) data such as existing sampling data (e.g., obtained from core, sidewall plugs, cavings, fragments, cuttings, etc.), laboratory results (e.g., reservoir, petrologic, mineralogic, geochemical, mechanical properties, etc.), and other suitable data. Before these data are applied in developing the HEM, compatibility, consistency, validity, and other quality measures are verified and cross-checked, for example, by statistical analysis of the distribution of these measured (or predicted) data within each defined cluster.

Turning to FIG. 1.1, in element (100), wellsite models are generated for multiple wellsites in the area of interest based on cluster analysis and cluster tagging performed on log data of the multiple wellsites. Generally speaking, cluster analysis is a common technique for statistical data analysis that assigns objects (e.g., oilfield data) into groups (i.e., clusters) so that objects in the same cluster are more similar to each other than objects from different clusters. Typically, similarity is evaluated according to a distance measure. More details of applying the cluster analysis and cluster tagging to generate a wellsite model are described in reference to FIGS. 2-3 below as well as in related U.S. patent application Ser. No. 11/617,993.

Continuing with FIG. 1.1, in element (102), a reference model is generated from the wellsite models. The reference model may be generated as a global reference model across the area of interest or as a local reference model updated and expanded iteratively to cover the entire area of interest. In one embodiment, the procedure in element (102) may be conducted as a single task when substantially all the well log data is available from the onset of this element. In such embodiments, substantially all clusters (i.e., building block units making up the HEM) intersected by the wells (which are part of the aforementioned wellsites in the area of interest) are identified by the cluster analysis. A global reference model is then constructed by cluster tagging to include the set of cluster units that minimizes the error of other data to the global reference model.

In another embodiment, the procedure in element (102) may be conducted on a well-by-well basis or incremental well group basis when partial well data are initially available (with additional well data becoming available during the course of element (102)). In such embodiments, at least some clusters in the area of interest may not be identified by the initial cluster analysis. Therefore, a local reference model is selected, by cluster tagging, as the set of cluster units that minimizes the error of the initial group of wells being analyzed to the local reference model. As additional well data is received, the local reference model is updated and expanded, as necessary by cluster tagging, to include newly identified cluster units from the additional well data as to minimize the error of the entire group of wells being analyzed to the new local reference model. The local reference model may then be updated and expanded iteratively to cover the entire area of interest when substantially all the well log data has been completely included in the procedure. As the local reference model expands it may cover a sufficient number of wellsites in the area of interest thereby becoming the global reference model for the area of interest.

In element (104) of FIG. 1.1, a contour plot is constructed to map cluster tagging errors on a cluster-by-cluster (i.e., a per-cluster) basis as a function of lateral distance (i.e., from a reference well) in the area of interest. As will be described in more detail in reference to FIGS. 2 and 3 below, cluster analysis uses statistical, multidimensional, log analysis to define similar and dissimilar combined log responses along the wells. These units (or cluster units) are the fundamental building blocks of the heterogeneous model. Results can be visualized graphically, in a variety of ways, to facilitate the rapid and unambiguous understanding of the results. For example, results of the multidimensional analysis are presented as a one-dimensional color display for easy visualization. Cluster Tagging allows the evaluation of log responses in a comparison well to log responses in a reference well. Cluster Tagging uses cluster definitions from the reference well to assign clusters to comparison well logs and outputs an error curve which evaluates the degree of compliance between the two wells.

An example clustering error and contour plot are described in reference to FIGS. 5 and 6 below. A graphical visualization, such as the contour plot, provides a visual guidance for identifying locations in the area of interest where additional new well data will provide the maximum benefit to populate and update the reference model (global or local). In the embodiment in which element (102) is conducted as a single task (global model), the compliance by all the wells in the model to the reference model is guaranteed. Thus, the are no errors between the cluster definitions in the individual wells and the reference model. In the embodiment in which element (102) is conducted on a well-by-well basis or incremental well group basis (local model), contour plots of cluster tagging error are constructed on a cluster-by-cluster basis as a function of lateral distance (i.e., from a reference well) based on the global reference model. In this case, contour plots representing the error map are updated as the local reference model is updated with the final goal of eliminating the error between the individual clusters and the reference model.

At any time during reference model development (global or local) and after completion of the reference model, the contour plots reflect the degree of confidence on the reference model throughout the area of interest. Areas with lowest error are areas with highest confidence, and areas with highest error are areas with lowest confidence. Thus, the contour plots provide a quantitative measure of how well the reference model represents the real variability of the earth formation in the area of interest. Good compliance between the two wells indicates a strong correlation of bulk log responses between the two wells and a strong similarity in material properties. Poor compliance between some sections or the entire section between the two wells indicates the presence of new (non-represented) facies. In one or more embodiments, cluster Tagging between wells and the analysis of the compliance index help monitoring changes in thickness and location of previously defined cluster units between wells, and help identifying new facies requiring coring and laboratory characterization.

In element (106) of FIG. 1.1, sampling recommendations are provided that identify well locations and core depth intervals to obtain additional sampling results. In one or more embodiments, vertical distribution (i.e., variations within a well) and lateral distribution (i.e., variations from well to well) of cluster units in the reference model may be visualized throughout the area of interest using three-dimensional visualization software. For example, multi-well cross-section plots may be displayed along various directions. Contour plots of the cluster tagging error may also be displayed for each of the clusters. The aforementioned plots facilitate the identification of the presence and areal distribution of each of these cluster units and associated degree of compliance to the reference model.

Using this information, well locations and well paths may be defined that maximize the intersection with cluster units present in the reference model. In one or more embodiments, this analysis may be conducted graphically (manually) or numerically (by numerical optimization). Accordingly, well locations and core depth intervals may be defined to allow the sampling of substantially all cluster units in the reference model. In one or more embodiments, the selected well locations and core depth intervals may be iteratively modeled and subsequently optimized based on economic and operational parameters (e.g., cost, accessibility, time, etc.) and/or considering various sampling options (e.g., whole core, rotary sidewall plugs, etc.).

In one or more embodiments, continuous measurements on the core of surface properties are conducted to evaluate core-scale heterogeneity. Comprehensive laboratory testing and detailed petrologic analysis may be conducted to study the core geology, core fractures, mineral composition, and relevant rock properties (e.g., reservoir, mechanical, geochemical properties, rock-fluid interactions, etc.) at the core-scale.

These continuous measurements on the core may then be combined with the results of cluster analysis defined based on log measurements on the cored well to optimize sample selection, representation of the (log-scale) cluster units identified in the core, and integration to geologic and petrologic analysis. More details of continuous measurements of surface properties are described in reference to FIGS. 7 and 8 below as well as in the related U.S. patent application Ser. No. 12/417,694, entitled "Continuous Measurement of Heterogeneity for Geomaterials."

Accordingly, sampling strategies may be defined based on the above results to optimize sample selection (e.g., coring or rotary sidewall plugging) across the area of interest to assure representation of samples for each cluster unit and adequate redundant sampling along dominant cluster units as the foundation for data population of the reference model across the area of interest.

In element (108) of FIG. 1.1, the reference model is updated using coring and sampling results obtained following the recommendation from element (106) above to create the heterogeneous earth model (HEM). The HEM represents the earth formation based on the clusters in the reference model as well as associated heterogeneous material property information. Embodiments describing techniques for updating the reference model based on sampling results may be found in related U.S. patent application Ser. No. 11/617,993 and related U.S. patent application Ser. No. 12/417,694.

In one or more embodiments, relationships between log responses and laboratory data may be created on a cluster-by-cluster basis to define a set of predictive models in the HEM. These models may then be applied to clusters defined in the reference model for evaluation of rock properties (e.g., reservoir, mechanical, geochemical properties, and rock-fluid interactions) at the regional-scale throughout the area of interest.

In one or more embodiments, the HEM may be used to track the gross similarity and dissimilarity between multiple producing regions in the field. Thus, even without properties defined for the clusters (empty cluster model), the user can be guided by the similarity of the cluster color pattern to identify other regions with similar bulk properties, and thus develop adequate best practices. Conversely, the user can be prevented for adopting practices from regions with dissimilar color patterns to his/her own. Thus, the HEM may provide value even when devoid of material properties. Furthermore, when populated with material properties (reservoir, mechanical, geochemical, geologic, etc), the HEM facilitates the simultaneous tracking and mapping of multiple properties across the region. For example, the HEM may be used to map the presence of a combination of properties (e.g., gas filled porosity, permeability, organic content and organic maturation) for defining reservoir potential.

In one or more embodiments, the HEM may include continuous profiles of measured data predicted from cluster analysis modeling to evaluate reservoir quality (e.g., by calculating reservoir quality based on optimal conditions of hydrocarbon in-place, permeability and organic content on a cluster-by-cluster basis) and rank these cluster units from best to worst reservoir quality.

In one or more embodiments, the HEM may include continuous profiles of measured data predicted from cluster analysis modeling to evaluate completion quality (e.g., by calculating completion quality based on optimal conditions of fracture containment, rock fracturability, and fluid sensitivity) and rank cluster units from best to worst completion quality.

In one or more embodiments, the HEM may include a color coded graphical representation to aid in the identification of regions with favorable combination of good reservoir and completion quality. Those skilled in the art will appreciate that the term "good" is subjective and that in the context of the application is used to convey a user's positive perception of region with respect to reservoir and completion quality.

In one or more embodiments, statistical evaluations of the distribution of properties (e.g., reservoir, mineralogical, geochemical, mechanical, etc.) for clusters included in the analysis may be generated to validate the robustness of the reference model and the HEM.

In one or more embodiments, the cluster-level models developed during the cluster analysis are available via numerical relationships relating material properties to log responses. The numerical relationships obtained between the measured rock properties and the associated multi-dimensional log responses are associated to the clusters sampled (e.g., via coring or rotary sidewall plugging). The HEM may include these numerical models to predict continuous properties based on logs from subsequent wells.

In one or more embodiments, the cluster-level models developed during the cluster analysis define statistical definitions of distributions of properties on a cluster-by-cluster basis. The statistical relationships defining the measured rock properties or rock properties obtained from continuous predictions based on logs are associated with the clusters identified (e.g., via coring or rotary sidewall plugging). The HEM may include these statistical models which define the distributions of properties associated with each cluster unit. These numerical models are typically statistically accurate and may be applied on a cluster level (non-continuous) or to a large number of wells.

In one or more embodiments, the HEM may rely on standard or specialized petrophysical interpretations of log responses, used on a cluster-by-cluster basis to define a set of representative properties for each cluster, and for defining predictive models in the HEM. These models may then be applied to clusters defined in the reference model for evaluation of rock properties (e.g., reservoir, mechanical, geochemical properties, and rock-fluid interactions) at the regional-scale throughout the area of interest In one or more embodiments, the process of coring, laboratory testing, petrophysical log analyses, integration of laboratory data with well logs, and associating the results to the specific cluster units, is repeated until substantially all the cluster units in the reference model are populated with data (numerical models or statistical data). Once the reference model is populated with associated material properties and mathematical relationships between the measured properties and the log responses, properties may be predicted along other regions in the HEM throughout the area of interest. For example, continuous profiles of measured properties for wells may be predicted using the HEM. Alternatively, statistically averaged values of measured properties for wells may also be predicted using the HEM.

Continuing with FIG. 1.1, in element (110) the HEM is updated to model horizontal wells in the area of interest. Log responses from horizontal or inclined wells are used to evaluate the lateral variability of cluster units between vertical wells. From time to time, inconsistencies may exist in data between vertical and horizontal wells. When horizontal wells do not include the same set of logs as used for defining the reference model, additional work may be required to update the HEM. In one or more embodiments, statistical cluster analysis techniques are used to develop a relationship between the logs measurements conducted on the horizontal well (e.g. MAD (measurements after drilling) Pass MWD (measurements while drilling) log suites, LWD (logging while drilling) measurements, component Gamma Ray, Elemental Capture Spectroscopy, Full-bore Formation Microimager, etc.) and the cluster zonation (i.e., the delineation of regions or zones defined by the different clusters resulting from the cluster analysis) defined in the reference model.

In one embodiment, the aforementioned relationship is developed using vertical wells that have the corresponding log suite representing the set of logs used on the horizontal well. Alternatively, if such vertical wells do not exist or can not be identified, the analysis may be performed by relating the vertical section of the horizontal well to cluster definitions on adjacent wells and in turn relating these cluster definitions to the data obtained in the lateral section of the horizontal well.

Once the relationship between log responses in the horizontal wells and cluster definitions based on logs from vertical wells is established, the correspondence may be applied to other horizontal wells in the area of interest. The result generally produces a better identification of the lateral spread of the principal building blocks (cluster units) of the reference model across the length of the horizontal wells.

In one or more embodiments, data from horizontal wells may be used to identify cluster units not intersected by the vertical wells therefore not previously defined from the cluster analysis. Accordingly, the reference model obtained using vertical wells may then be updated based on the sampling recommendations, laboratory testing, and core-log integration techniques as described with respect to elements (106) and (108) above.

In element (112) of FIG. 1.1, the HEM is updated based on interpolation using regional-scale data. From time to time it may not be possible to define the presence, distribution, and stacking patterns of cluster units between wells using exclusively well-scale data from vertical wells without the benefit of regional-scale data due to the inherent non-continuous distribution of material properties in the area of interest.

In one or more embodiments, reference wells are identified for integrating the HEM with regional (e.g., seismic) data. In such embodiments, wells intersecting the volumetric coverage of regional-scale measurements (e.g., seismic) are identified for well-scale to regional-scale data integration. Results of cluster analysis from these identified wells are used as boundary conditions to define relationships between regional-scale data and well-scale data. In some embodiments, a portion of these wells may be selected and isolated from the initial cluster analysis to be used for subsequently validation.

In one or more embodiments, regional-scale data (e.g., seismic) is processed using specialized mathematical routines (e.g., Thin Bed Analysis, Extrema Analysis, Ant Tracking Analysis, etc. which are registered trademarks of Schlumberger Technology Corporation, located in Houston, Tex.) to compare parameters or combinations of parameters measured at regional-scale with respect to cluster units identified using data at well-scale. Iterative Elements may be used to change the combinations of properties (e.g., use combinations of seismic attributes resolved in 3D seismic processing) and the methods of analysis to obtain a strong correlation between the regional-scale data at the wellbore face and the cluster analysis along the same wellbores. The iterative elements may continue until the error between the zonation from cluster analysis and the regional-scale is minimized.

The HEM may then be updated using the relationships determined by integrating regional-scale to well-scale data. The updated HEM may then be able to more accurately predict the presence, distribution, and stacking patterns of cluster units between wells. The HEM may then have true 3D continuity and be used for generating grid models for use as input to high-end numerical analysis of reservoir simulations, regional-scale mechanical deformation, basin-scale reconstructions, and others. In a 3D grid model, every point in the grid has defined properties. Thus, the 3D grid model is amenable for importing data to numerical models.

FIG. 1.3 shows an example volumetric representation of the HEM in accordance with one or more embodiments. In FIG. 1.3, cross hatch patterns (i.e., hatching configuration) are used to substitute color based on the mapping legend. As shown, FIG. 1.3 represents a portion of the area of interest including two wells (138 and 140) penetrating a reservoir section (144). As described above, the HEM is constructed starting with well scale data (142) associated with the wells (e.g., 138 and 140). After integration with seismic data or other type of regional-scale data, the HEM initially defined at the wellbore face of the wells (138 and 140) is now defined across the volumetric region of interest. This allows the specification of grid models (with each node of the grid represented by material properties) for numerical calculations and forward predictions. Further, material properties may be represented in color in the graphical display depicted in FIG. 1.3 where portions of the reservoir section (144) may be identified as problematic rock (146), best reservoir quality (148), etc. Further details of such identification are described in reference to FIGS. 11-12 below.

Continuing with FIG. 1.1, in element (114) the HEM is updated based on interpolation using well-scale data from horizontal wells. In one or more embodiments, well-scale data along horizontal and inclined wells is used to obtain a representation of lateral variability in between vertical wells as an alternative to interpolate using regional-scale measurements as described with respect to element (112) above. An example of the observable heterogeneity along lateral wellbores in shown in FIG. 9.2 below. As shown, the volumetric heterogeneity may be better defined by mapping cluster units along multiple lateral wellbores In one or more embodiments, in addition to well-scale data, other regional data (i.e., electro-magnetics, gravity, and existing geologic stratigraphic models) may also be used. The method may include either or all the regional data available, with the goal of improving the representation of the cluster data defined at the well locations, to the region in between wells. When no additional regional-scale data is present, the volumetric model is generated by interpolations of the well data from well using standard statistical techniques, aided by the definition of the geologic model between wells.

Based on techniques described above, the HEM may then be populated with data that is more representative of variability of material properties (as defined by the variability in cluster units) with improved population of vertical, horizontal, and deviated wells using cluster analysis, cluster tagging, and statistical interpolation within the area of interest. Furthermore, using the additional data, the predictions by the HEM may be compared and validated using wells and well-scale data that were previously excluded from the modeling process.

When applied to hydrocarbon exploration, the heterogeneous earth model may be used to identify regions for economic production of hydrocarbons from wells resulting from a combination of good reservoir quality and good completion quality. For example, the heterogeneous earth model may be used to identify regions for economic productivity in low permeability reservoirs. The reservoir quality typically defines favorable conditions of hydrocarbons accumulation and deliverability (e.g., gas filled porosity, permeability, pore pressure, and organic content), and the completion potential typically defines favorable conditions of completion and producibility (e.g., vertical containment for hydraulic fracture growth, rock fracturability, low fluid-rock interaction, and retention of fracture conductivity after fracturing). When both conditions of reservoir quality and completion quality are satisfied, the full potential of reservoir production may be realized. On the contrary, a good quality reservoir unit without completion quality, or a good completion quality region without reservoir quality may both result in poor production.

Continuing with FIG. 1.1, the following are examples of using the HEM developed in elements (100) through (114) to solve field problems, for example to identify "sweet spots." The examples are not intended to limit the scope of the HEM for a reservoir field.

In element (116), cluster units throughout the area of interest are visualized by constructing volumetric representations of distribution and variability of each of the material property sets based on the HEM. In one or more embodiments, results are presented in color-coded three-dimensional (3D) displays for easy interpretation and visual understanding. In one or more embodiments, volumetric contour representations of the data may be created for vertical/horizontal sections or other cross-sections as two-dimensional (2D) plots to facilitate rapid analysis of the results. Example graphical representations of the HEM are described in reference to FIGS. 9.1-9.2 and 10-12 below.

In the aforementioned examples shown in FIGS. 9.1-9.2 and 10-12, cross hatch patterns (i.e., hatching configuration) are used to substitute color based on the mapping legend. The units with similar hatching configurations represent units (i.e., 2D and 3D regions within the area of interest) with similar behaviors (e.g., similar material properties, reservoir quality, etc.) while units with different hatching configurations represent units with different behaviors (e.g., different material properties, reservoir quality, etc.). In addition, where possible, these groups are further classified based on estimates from good reservoir quality to bad reservoir quality, good completion quality to bad completion quality, and high fluid sensitivity to low fluid sensitivity in order to facilitate the visual interpretation of the results.

Continuing with FIG. 1.1, in element (118) zones with best production potential in the reservoir field are identified based on the HEM. In one or more embodiments, contour plots are investigated to identity locations of combined high reservoir quality and high completion quality. Furthermore, the contour plots may be integrated together with traditional data of geologic bed boundaries, stratigraphy, structural architecture, curvature maps, faults, fractures, well production, microseismic monitoring, known stress direction and magnitudes, and other applicable data.

In element (120), analysis is performed for the zones identified in element (118) to provide inputs to operations of the reservoir field. For example, thickness analysis of cluster units with good reservoir quality may be performed to assess producible reserves, thus developing more accurate estimates of producible reserves. In another example, locations with combination of high reservoir quality and poor completion quality may be identified as requiring different completion strategy, thus providing a strategy for increasing field production. In yet another example, locations with combinations of poor reservoir quality/high completion quality and/or poor reservoir quality/poor completion quality may be identified in the reservoir field as zones with no production potential.

Furthermore, inputs may also be used to determine operations of the reservoir field based on the populated HEM, such as landing horizon and well path trajectory for intersecting desirable cluster units, stability evaluation along a proposed well path and trajectory, perforation strategy and interval, in-situ stress assessment, analysis of microseismic data, large scale evaluation for coupled modeling, stress redistribution and mechanical interference among the plurality of wellsites, etc. Additional applications using the HEM regarding mechanical stability and hydraulic fracturing operation are described below.

Continuing with FIG. 1.1, the HEM is calibrated based on actual mechanical failure data of wellsites throughout the reservoir field in accordance with one or more embodiments. The model may be calibrated simultaneously with field data of well failures (element (122)). The calibrated model may then be used for evaluating and predicting the stability of wells with arbitrary well paths in the reservoir field (element (124)). These calculations based on the HEM take into account failure results from stress concentrations associated with cluster units having contrasting properties and distinct mechanical behavior (e.g., elastic/isotropic, elastic/anisotropic, non-elastic, stress dependent, etc). Such considerations may improve the accuracy of the HEM model over models constructed by identifying a representative homogeneous equivalent.

Traditional fracture prediction analysis relies on analysis of curvature. Regions with highest curvature are assigned with the highest potential for fracturing and thus highest fracture density to indicate productivity potential. Although regions of highest curvature may occur on rock units that may accommodate this degree of deformation, however, stiffer, adjacent, rock units may exhibit higher fracture density while being subjected to lower degrees of curvature. Thus, superposing curvature analysis to cluster base definitions of material properties may provides more accurate results.

In one or more embodiments, hydraulic fracture potential (i.e., containment to vertical growth and potential for fracture complexity) is calculated to determine hydraulic fracturing solution based on the HEM. The model may be used to perform global calculations of the hydraulic fracturing potential from a large number of wells simultaneously (element (126)). Such calculations provide visualization on whether template solutions are applicable to the field as a whole, or to specific regions of the field. These results provide the basis for defining completion quality. The model may also help identify changes in completion strategy from region to region throughout the reservoir field. Further details of element (126) are described in reference to FIG. 1.2 below.

As shown in FIG. 1.2, the HEM is queried regarding the presence of regions with good reservoir quality. In one or more embodiments, an automatic process may be used to identify the cluster color or colors that represent the clusters with target (e.g., best) reservoir quality and thus the target reservoir regions for hydraulic fracturing (element (128)). For example, the target reservoir regions may be identified to satisfy a minimum thickness requirement. In one or more embodiments, these target reservoir regions may be identified along each well in the HEM model.

Figure 13:
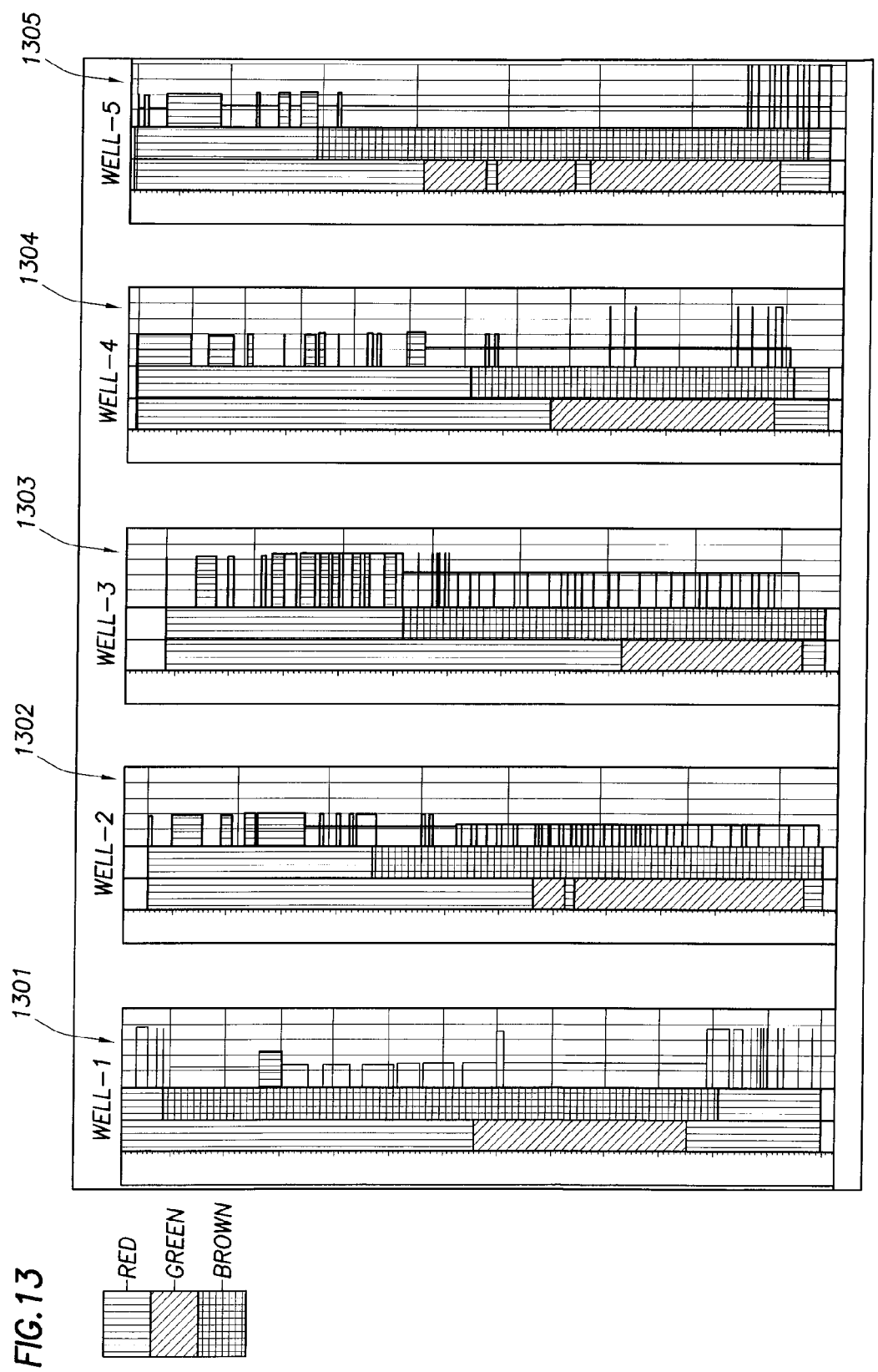
FIG. 13 shows a graphical representation of multi-well fracture containment evaluation and a data display in accordance with one or more embodiments.

Accordingly, a display is automatically generated of the thickness of these reservoir regions (element (130)). Results can be visualized through navigation through the HEM model or by creating cross sections along desired directions. An example display is shown in FIG. 13 below where the reservoir thickness is represented in brown color. In FIG. 13, hatching configurations are used to substitute color based on the mapping legend.

Returning to FIG. 1.2, once the reservoir regions are identified, hydraulic fracture simulations from these regions are initiated across all wells in the model (element (132)). In one or more embodiments, these hydraulic fracture simulations may be comprehensive 3D computations of hydraulic fracture propagation with specified conditions of pumping rate, fluid properties and proppant transport, or simpler and computational less expensive one dimensional simulations of fracture height growth. For example in the simulation, perforations may be placed along the entire height of the identified target reservoir regions while fracture height growth is calculated in response to increased injection pressure.

In one or more embodiments, the simulation results provide a definition of fracture height growth (upwards and downwards) on a well to well bases. For example, fracture height growth for wells (1301-1305) is represented in green color in FIG. 13. The graphical display may further includes containment, at the well level, to allow visualization of the wells where the hydraulic fractures are predominantly contained and thus generate surface area in the desired reservoir units and wells where the hydraulic fracture is uncontained and generates surface area outside the reservoir units.

To quantify the condition of containment or lack of containment and visualized regionally, a reservoir quality index may be defined by dividing the resulting fracture height to the reservoir thickness (i.e., reservoir height) (element (134) in FIG. 1.2). This calculation can also be done along the lower or upper sections of the reservoir to discriminate between upper or lower containment. The result is a number that is close or equal to one, for well contained cases, and closer or equal to zero for uncontained cases.

Continuing with FIG. 1.2), a graphical display (e.g., 3D color maps or contour maps) of this reservoir quality index along the region of interest may be generated and presented to a user to visualize the distribution of containment quality across the region of interest (element (136)).

As discussed above, related U.S. patent application Ser. No. 11/617,993 describes using cluster analysis and cluster tagging to generate a wellsite model. In this related application, different embodiments recognize that being able to analyze different types of data available from well sites is useful in identifying formations. In particular, using different types of data obtained from a well site allows for identifying heterogeneity in formations or regions over which the well site sits. These embodiments also facilitate the selection of coring sampling locations based on the identified heterogeneity, and solutions for various oilfield problems. In these illustrative embodiments, the heterogeneity of a formation is identified using continuous well data. This continuous well data includes, for example, well logs, measurements while drilling data, mud logs, drill cuttings, and other information that are combined to form a multi-dimensional data set. After sampling occurs, material properties are measured and these properties are associated with the multi-dimensional data. These material properties include, for example, reservoir, geochemical, petrologic, and mechanical properties. Further, the characteristic material behavior (e.g., elastic/isotropic, elastic/anisotropic, nonelastic, stress sensitive, etc.) of each cluster are defined to result in better cluster-scale models. Next, models for propagating each of the measured properties along the length of the wellbore are obtained.

In addition, models for predicting properties in other well sites and making decisions about the well site also may be obtained from this information. In this manner the different illustrative embodiments allow for a construction of non-conventional three dimensional models that are based on well data for use in managing a reservoir. This information may be used for better discrimination of production sweet spots, for improving the definition of the geologic model, and for better guidance for drilling and production planning.

FIG. 2 shows a graphical representation (202) of cluster analysis results of log measurements (201) in accordance with one or more embodiments. As shown in FIG. 2, the log measurements (201) may be porosity, resistivity, gamma ray, borehole imaging, mud-log, continuous measurements while drilling, continuous drilling surveys, or any other types of log measurements. As an example, the graphical representation (202) of cluster analysis results shows dominant lithologic rock units with similar and dissimilar characteristic material properties (reservoir and mechanical) identified by the analysis. In one or more embodiments, these units are the fundamental building blocks of the heterogeneous model. In one or more embodiments, rock units with similar characteristic material properties are represented in similar colors while rock units with dissimilar characteristic material properties are represented in different colors. In the graphical representation (202), hatching configurations are used to substitute color based on the mapping legend. Although log measurements are used in the example cluster analysis shown in FIG. 2, any type of data may be used, including logs, numbers, tables, or other multi-dimensional data set described above.

Figure 3:
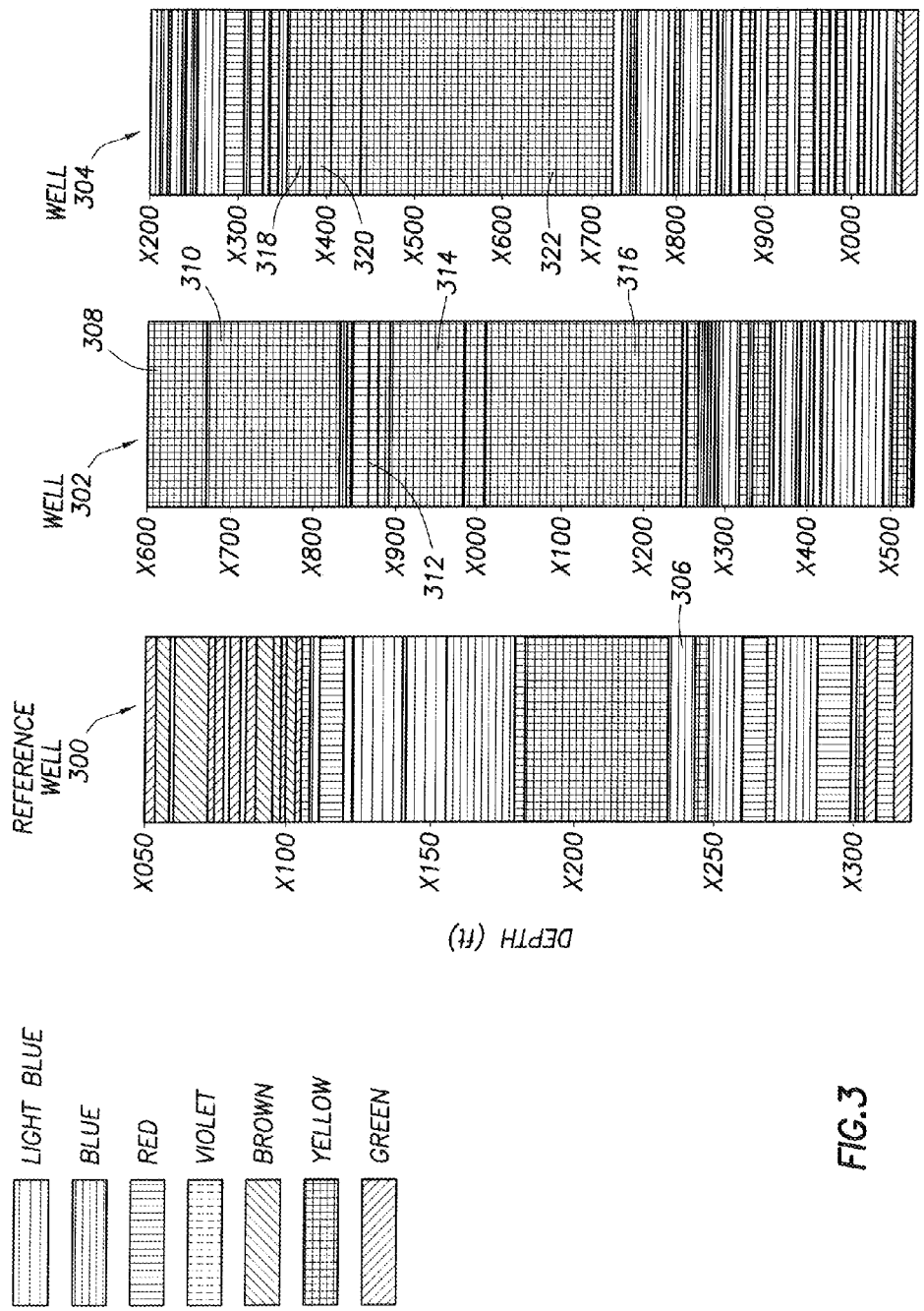

FIG. 3 shows graphical representations of cluster tagging in accordance with one or more embodiments. In this example, graph (300) is an example of results generated from cluster analysis. In one or more embodiments, properties of clusters are represented by colors. As shown in FIG. 3, hatching configurations are used to substitute color based on the mapping legend where the same hatching configuration represents the same properties for different cluster units in a formation. Cluster units having the same hatching configuration in graph (300) are of the same type in these examples. Once these different cluster units or regions have been identified, the definitions of these clusters in terms of multi-dimensional data may be used as a reference for identifying the same type of clusters on other subsequent wells. This identification is referred to as cluster tagging.

As described above, the scenario of the global model results in a model that has no errors and is applicable to all wells in the region. The scenario of the local model is a living model that may initially compare poorly to some or multiple wells in the region (i.e., poor compliance) but is gradually updated and improved until the representation is complete. In performing cluster tagging, multi-dimensional data from the target well site having the same types of data as those in the reference well site are used to perform cluster tagging in these depicted embodiments. The multi-dimensional data at a selected depth for the target well site is compared to a reference set of data for the reference well site. This reference data is the multi-dimensional data for the different types of clusters that are present in the reference well. A determination is made as to whether the data from the target well site at the selected depth has a best fit or correlation for the data from the target well site for a particular type of cluster in the reference well. If such a correlation is present, the selected depth of the target well site is considered to be of the same cluster type for the reference well site. In some cases, the target well site may have a cluster type that is not present in the reference well site. In this case, a best fit or correlation does occur when the determination is made, but a compliant curve indicates that the fit is poor.

Then, the multi-dimensional data may be analyzed to identify characteristics for properties present in the multi-dimensional well data for each type of cluster unit that is present to create a model of the target well. In addition, similar wellbore data may be examined for other wells and the wellbore data for sections matching identified cluster units may be used to make similar identifications in those wells. For example, graph (302) and graph (304) are examples of cluster tagging performed on adjacent wells with reference to the reference well associated with graph (300). If a particular cluster unit is identified as having a best reservoir quality based on the complete analysis for graph (300), similar cluster units may be identified in the other wells. For example, cluster unit (306) is identified as providing the best reservoir quality. By using the multi-dimensional data for this particular cluster, the information may be compared to the same type of data for the other wells to identify cluster units in those wells that also have the best reservoir quality. In these examples, these are found in cluster units (308, 310, 312, 314, and 316) in graph (302). Regions (318, 320, and 322) in graph (304) are cluster units identified as having the best reservoir quality based on comparing the multi-dimensional well data between the different wells.

Thus, these examples indicate that a well productivity may occur for subsequent wells and that the second well as represented in graph (302) may provide the most productivity. In this manner, the results of the cluster analysis may be used to predict the makeup or properties within other wells. This type of cluster tagging may be performed without requiring the same analysis performed with the reference well. With this information, samples or tests may be made in the appropriate predicted cluster units to verify the results.

Figure 4:
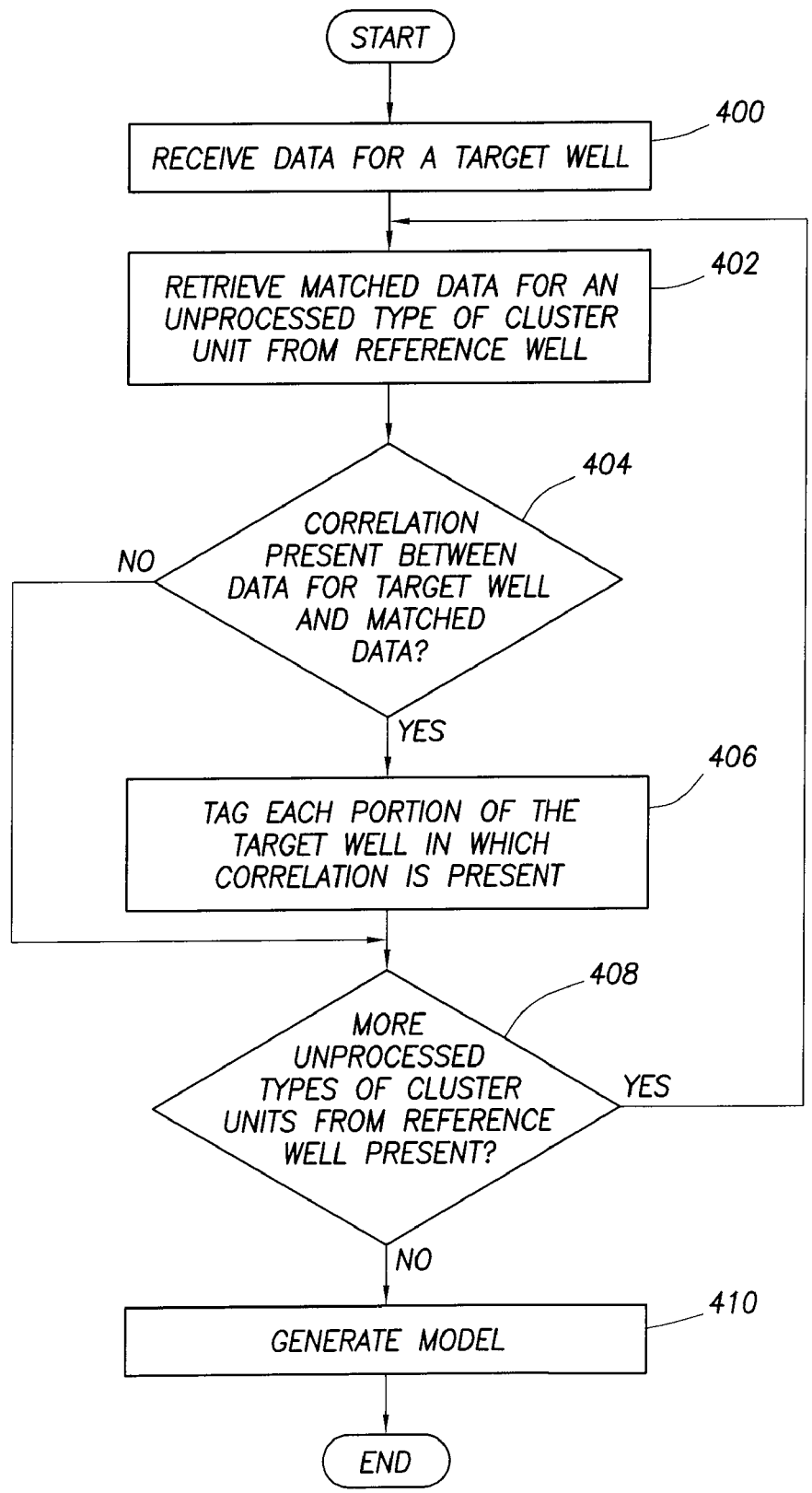
FIG. 4 shows a flow chart for generating a model using cluster analysis in accordance with one or more embodiments.

FIG. 4 shows a flow chart for generating a model using cluster tagging in accordance with one or more embodiments. In one or more embodiments, one or more of the elements shown in FIG. 4 may be omitted, repeated, and/or performed in a different order. Accordingly, embodiments for generating a model using cluster tagging should not be considered limited to the specific arrangements of elements shown in FIG. 4. The process begins by retrieving data for a target well (element (400)). The data retrieved for the target well in (element (400)) is the same type of data used to match cluster types in FIGS. 2-3.

Thereafter, matched data for an unprocessed type of cluster unit from the reference well is retrieved (element (402)). This matched data is generated from the cluster analysis illustrated in FIGS. 2-3 above. Thereafter, a determination is made as to whether a correlation is present between data for a target well and the matched data (element (404)). In other words, this matched data is data that provides a definition of a type of cluster in the reference well. This data is compared to similar data for the target well to determine whether the data at a particular depth for the target well has the same cluster type as the cluster type for the matched data. In these examples, a correlation may be present if an identical match is present. Different currently available statistical techniques may be used to determine when a correlation is present in element (404).

In other words, in element (404), a comparison between the multi-dimensional data of the reference well is made with the multi-dimensional data of the target well. More specifically, the multi-dimensional data associated with an identified cluster type in the reference well is compared to multi-dimensional data for the target well to determine whether a correlation is present such that the type of cluster unit present in the reference well is considered to be present in one or more depths for the target well. This correlation is also referred to as a degree of fit or compliance. When the compliance is acceptable, then the corresponding portion of the target well is accepted as having the similar type of cluster unit. When the compliance is large or considered unacceptable, the section is flagged and represents a different cluster unit that is not of a type present in the reference well. In other words, the target well may contain a type of cluster unit that is not present in the reference well. As described above, such a situation (or situations) arises in the local model.

If a correlation is present, the process tags each portion of the target well in which the correlation is present element (406). Thereafter, a determination is made as to whether additional types of cluster units from the reference well are present that have not been processed (element (408)). If additional unprocessed types of cluster units are present from the reference well, the process returns to element (402). Otherwise, a model of the target well is generated (element (410)) with the process terminating thereafter. In creating the model in element (410), the identified cluster units are used to generate a model containing colors that identify cluster types for cluster units at different depths. Depending on the comparison of the data in element (404), the target well may contain a cluster type that is not present in the reference well. This cluster type may be identified with the color, but properties of the cluster type cannot be predicted as accurately because no corresponding cluster type is present in the reference well.

In these examples, the model generated in element (410) is generated from the identification of cluster definitions for the target well. The model contains the mathematical relationships between measured data and log responses and the statistical definitions of these continuous or predicted properties for the target well based on those models developed for the reference well. This element is performed by applying the models defined at the cluster level to the results from cluster tagging. This type of model is created using the results, such as those shown in graph (302) or graph (304) in FIG. 3.

Continuing with in FIG. 4, if a correlation between the data for the target well and the matched data are not present the process proceeds to element (408) as described above. With the model generated in FIG. 3, corresponding sampling and laboratory testing may be conducted to verify the cluster types. Further, sampling and testing may be used to identify a new type of cluster present in the target well that is not found in the reference well. This new identification may then be used for subsequent cluster tagging of other wells or areas that are of interest. Depending of the implementation, the model may just include an identification of the different types of cluster units without actually including the properties of each type of cluster unit. Thus, the information provided in the different models in these illustrative embodiments may differ depending on the particular implementation.

In this manner, many wells for well sites may be modeled without requiring the analysis made for a reference well. These models then may be used to identify depths at which samples may be taken to verify the accuracy of the models. With this information, the results may be made available to different well sites corresponding to the models for use in facilitating decision making and affecting well site operations. This information may be used at particular well sites for performing coring or sidewall plugging or for collection of any type of sampling from specific depth locations identified through the models. Further, the information containing the analysis of the reservoir may be used to identify the portion of the formation with the best reservoir quality of best completion quality. This information may then be used to initiate well operations, such as hydraulic fracturing or perforating through a particular zone.

Further, seismic data, regional-scale data, and/or inclined and horizontal well data may also be used in the multi-dimensional data to interpolate cluster definitions between wells. In this manner, the identification of different regions may be identified through interpolate of the data for reference and target wells for which models have been generated. A three-dimensional representation of a formation may be made through the data collected from the different wells and the prediction made about the regions between the wells. Further, a volumetric grid data model required for numerical simulations may also be generated accordingly.

Figure 5:
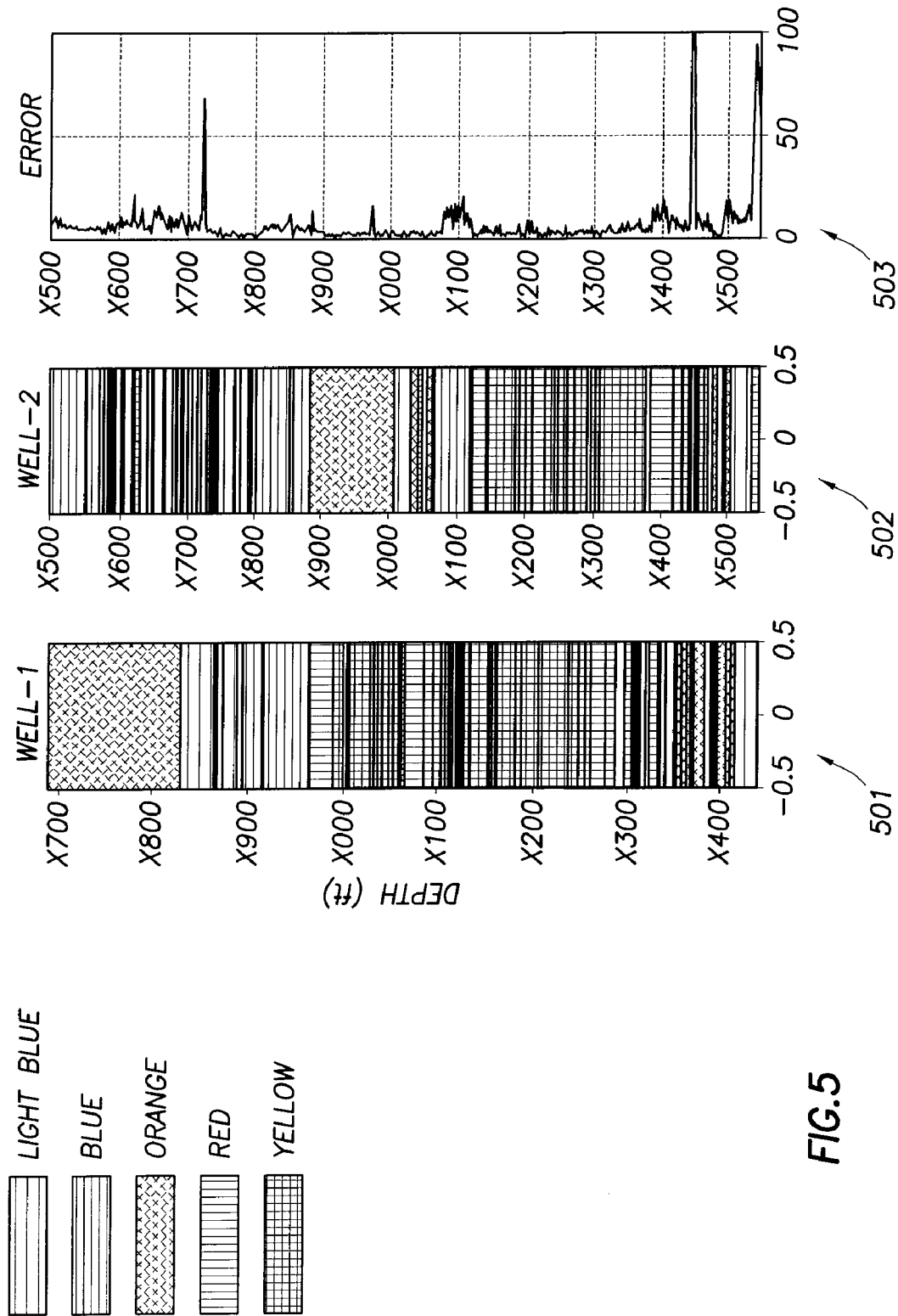
FIGS. 5-6 show an example cluster tagging error and contour plot in accordance with one or more embodiments.

FIG. 5 shows an example multiwall analysis cluster tagging error in accordance with one or more embodiments. As shown in FIG. 5, a tagged well (well-2 (502)) is compared against a reference well (well-1 (501)) to identify similarity in the combined log responses. In one or more embodiments, low error (e.g., <40) signifies good compliance between units with equal colors while high error (e.g., >40) signifies limited to no similarity, and thus the presence of previously unidentified units. In the example shown in FIG. 5 where cross hatching configurations are used to substitute color based on the mapping legend, the two wells have the same rock units, represented in similar hatching configurations, in different location, thickness and stacking pattern. The error curve (503) indicates a high level of compliance between the two, except in specific discrete zones, as shown.

Figure 6:
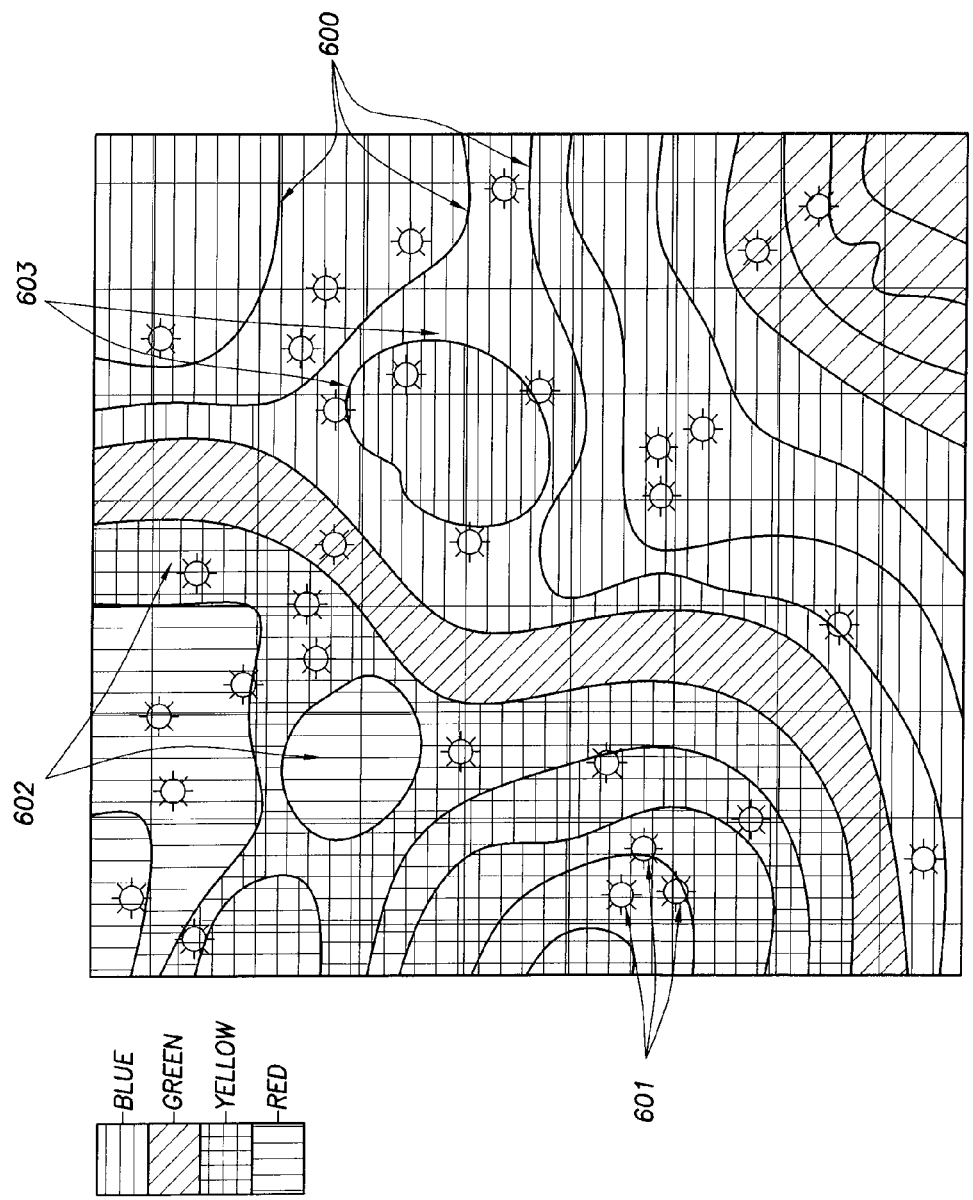

FIG. 6 shows an example cluster tagging error contour plot in accordance with one or more embodiments. As shown in FIG. 6, contours of compliance of units with best reservoir quality to the model are provided using the contour lines (600) across the reservoir field having wellsites (601). In FIG. 6, cross hatch patterns (i.e., hatching configuration) are used to substitute color based on the mapping legend. Red to yellow colors represent regions (e.g., 602) of poor compliance while dark blue to light green colors represent regions (e.g., 603) of good compliance. In FIG. 6, hatching configurations are used to substitute colors, based on the mapping legend, to represent compliance of units to the model. This information allows quantification of the reliability of the model across the field and provides input for optimizing the core representation. For example, additional core should be taken on regions (602) with poor compliance. These contours of compliance/error illustrate where the developed model is applicable. Areas of good compliance (603) suggest that the log data are well correlated with the log data that make up the model set, and so the associated properties should be similar to those of the existing model therefore additional sampling is not necessary. In areas of poor compliance (602), the logs are not well represented by the model and so there are no equivalent analogues in the model to these portions of the basin therefore additional sampling should be considered. That is, this suggests that there are new zones in these areas that would need to be characterized.

Figure 7:
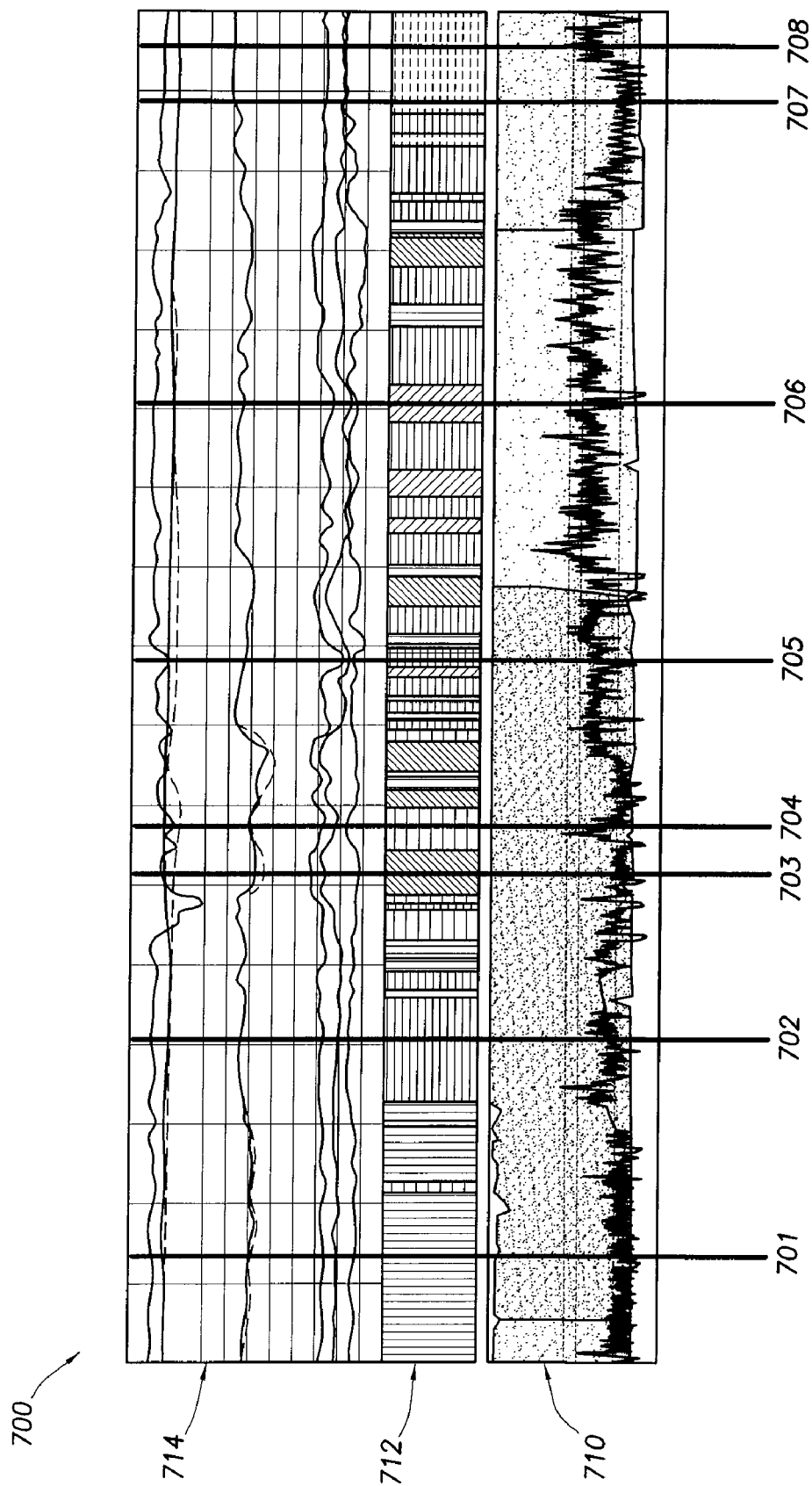
FIGS. 7-8 show graphical representations of statistical analysis of core measurements in accordance with one or more embodiments.

FIG. 7 illustrates a graphical representation of a cluster analysis for core measurements in accordance with one or more embodiments. The graph (700) includes eight different cluster groups (701-708), where each cluster group corresponds to a hatching configuration displayed on the cluster graph (712). Although each cluster group corresponds to a number in this example, each cluster group may also correspond to a color. A hatching configuration on the cluster graph (712) represents a depth where the characteristics corresponding to the cluster group of that hatching configuration are more prevalent than the characteristics corresponding to the other cluster groups. The continuous measurement (e.g., produced by a scratch test) on the core sample (710) shows variability along the length of the core sample (710) in terms of pound per square inch (psi). The scratch test measurement of the core sample (710) may be overlaid with an image of the core sample (710). Log responses within each cluster (e.g., 714) are also shown along the length of the core. An analysis using these results may allow for a user to identify potential candidates for subsequent core sample selections.

Figure 8:
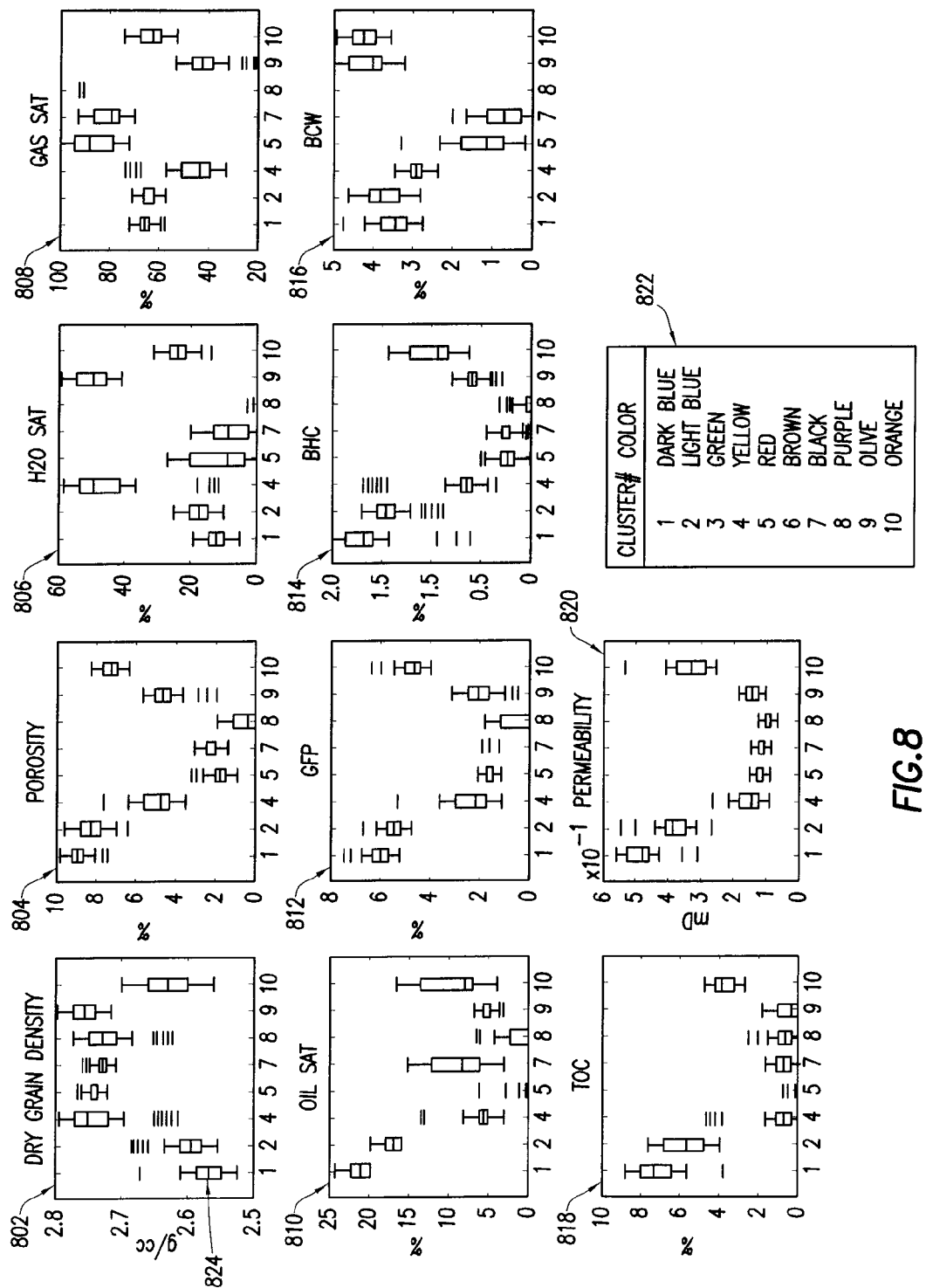

FIG. 8 illustrates a graphical representation of a cluster analysis for core measurements in accordance with one or more embodiments. Multiple samples are obtained from each cluster unit and from various representations of this unit along the vertical extent of the core. Statistical distributions (box and whisker plots) with low variability (short boxes) are indicative of unique properties associated to these cluster units. These values are used for subsequent population of properties throughout the model. More specifically, FIG. 8 illustrates a series of box and whisker plots (e.g., 802-820), each representing a continuous predicted property (e.g., dry grain density, porosity, etc.) on a cluster-by-cluster basis. A legend (822) specifies a designation for each cluster represented in the box and whisker plots (e.g., 802-820). The consistency of the clusters in representing unique sets of properties is assessed based on the size of the box plots (e.g., 824). The smaller the size of the box plot, the narrower the distribution, which indicates a higher degree of confidence in the assessment of that property in that cluster.

FIG. 9.1 shows an example color-coded well model representation of the HEM in accordance with one or more embodiments. The representation is based on an example data set consisting of a large number of vertical, deviated and horizontal wells (901, 902, 903, etc.) used in developing the HEM. A portion of FIG. 9.1 enclosed in a circle is shown in FIG. 9.2 in expanded detail. In particular, the three wells referenced as 903 are shown in an expanded form that captures the representation and distribution of the principal rock units with unique material properties along each well. Cluster analysis and analysis of compliance on each well provides the representation and distribution of the principal rock units with unique material properties along each well. In FIGS. 9.1 and 9.2, hatching configurations are used to substitute colors, based on the mapping legend, to identify the rock units along each well. These data provides boundary conditions for statistical analysis and for constructing the volumetric representation of the heterogeneous reservoir. When the well population is poor, additional data from regional measurements (e.g., seismic, gravity, magneto-telurics, or other data) is used to facilitate the interpolation between wells.

Figure 10:
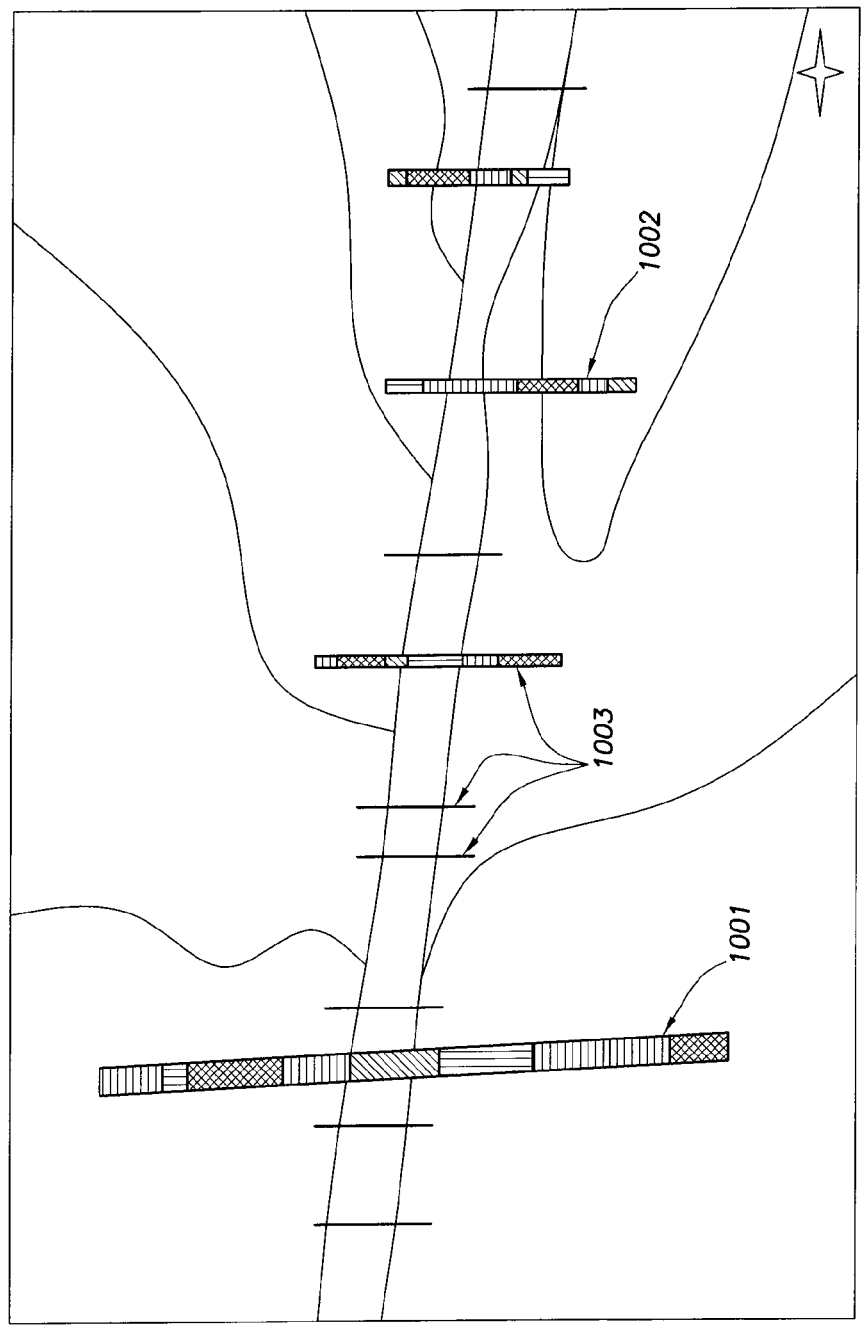
FIG. 10 shows an example three dimensional (3D) volumetric representation of the HEM in accordance with one or more embodiments.

FIG. 10 shows another example color-coded volumetric representation of the HEM in accordance with one or more embodiments. Based on this representation, surfaces bounding the regions with highest density of weak rock units, and thus with highest propensity for failure during drilling, are defined. The bounding surfaces are shown as intersecting the top and bottom of well segments (1001, 1002, 1003, etc.). This provides guidance for reducing problems (i.e., by modifying drilling plans, or drillpaths).

Figure 11:
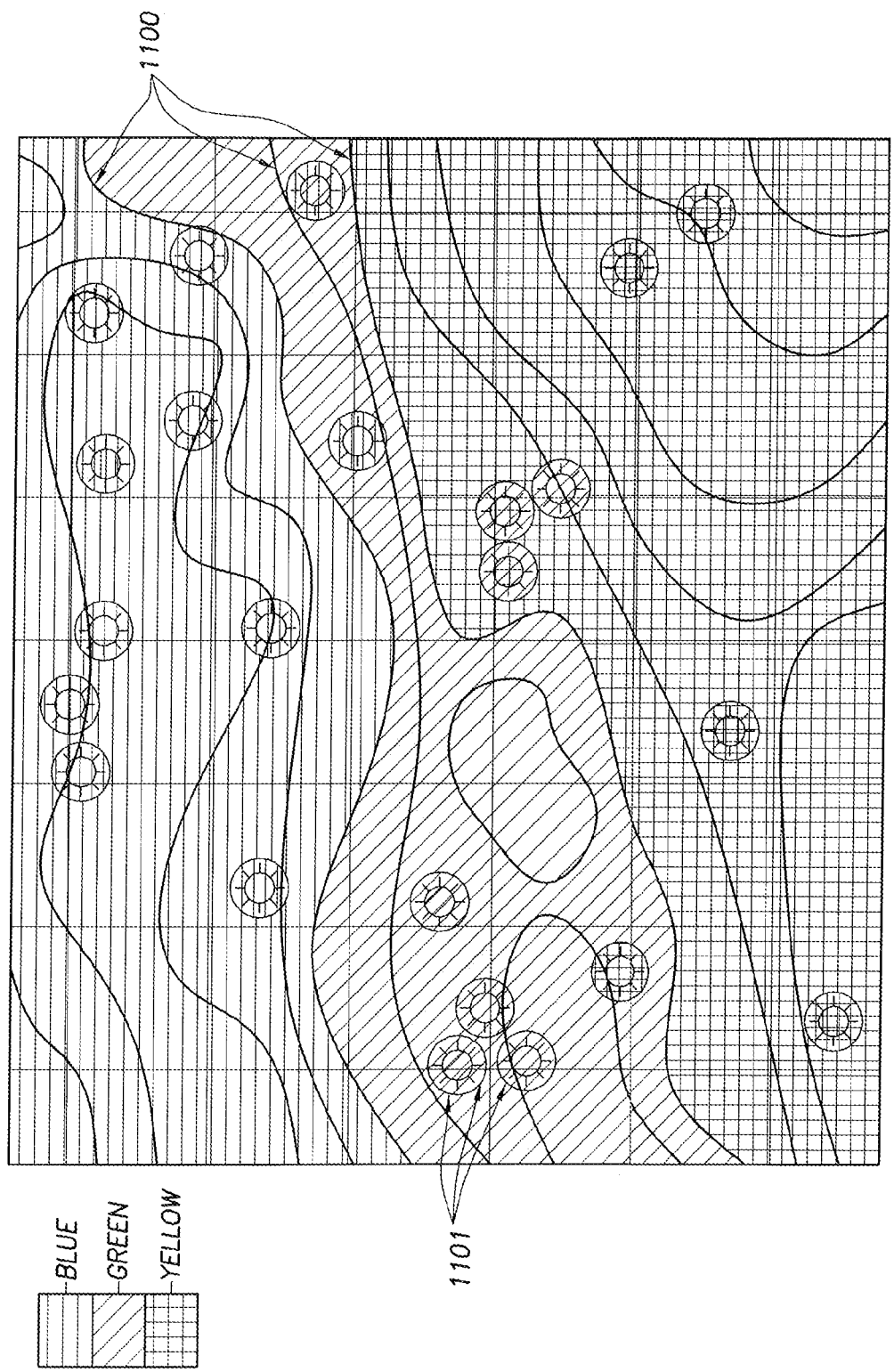

FIG. 11 shows yet another example volumetric representation of the HEM in accordance with one or more embodiments. In this representation, contours of thickness of units with good reservoir quality are provided using the contour lines (1100) across the reservoir field having wellsites (1101). In FIG. 11, cross hatch patterns (i.e., hatching configuration)

are used to substitute colors, based on the mapping legend, to represent thickness of units. This information allows more accurate computations of producible hydrocarbons and resource evaluation.

FIG. 12 shows still another example volumetric representation of the HEM in accordance with one or more embodiments. In FIG. 12, cross hatch patterns (i.e., hatching configuration) are used to substitute color based on the mapping legend. In this representation, the contour lines (1202, 1203, 1205, etc.) define thickness of best reservoir quality (e.g., blue is thick and red is thin). The background color map represents the ratio of reservoir thickness to hydraulic fracture height (e.g., good containment is blue and bad containment is red). The regions of best reservoir quality and best containment quality are "sweet spots" in the reservoir field. In this example, these are defined by the combination of blue contour lines (1205) juxtaposed to blue background color (1204). This representation of HEM also identifies regions in the reservoir field with high reservoir quality but poor containment (e.g., light blue color contours (1202) and green through red background color (1201)). Accordingly, changing the strategy for completion on these regions of the reservoir field will significantly improve field productivity.

FIG. 13 shows graphical representations of multi-well fracture containment evaluation and data display in accordance with one or more embodiments. The example shown in FIG. 13 is generated using the hydraulic fracturing computation described in reference to FIG. 1.2 above, which shows effective reservoir thickness in green, overall fracture height growth in brown, and additional containment information in various other colors for wells (1301-1305). In FIG. 13, cross hatch patterns (i.e., hatching configuration) are used to substitute color based on the mapping legend. As shown in FIG. 13, the color graphic display allows rapid evaluation of conditions of fracturing containment across the field by a user. For example, the changing conditions of hydraulic fracturing containment from well to well may be visualized immediately. In one or more embodiments, the reservoir quality index (i.e., ratio between reservoir thickness to fracture height) described in reference to FIG. 1.2 above may be plotted as a contour plot in the similar format as those of FIGS. 11 and 12 for user evaluation.

Figure 14:
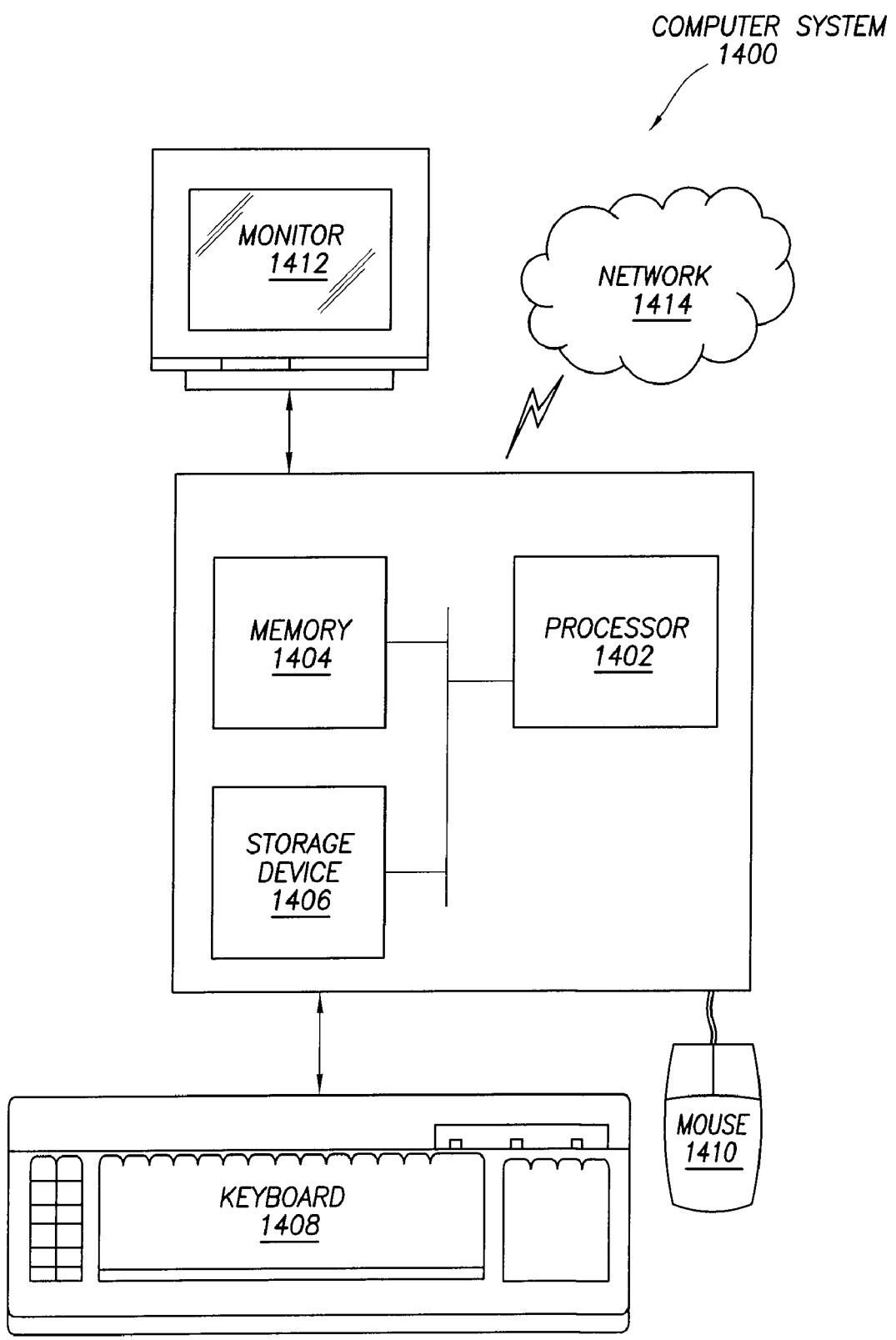
FIG. 14 shows a computer system in accordance with one or more embodiments.

The HEM for a reservoir field (or portions thereof), may be implemented on virtually any type of computer regardless of the platform being used. For example, as shown in FIG. 14, the computer system (1400) may include a processor (1402), associated memory (1404), a storage device (1406), and numerous other elements and functionalities. The computer may also include input means, such as a keyboard (1408) and a mouse (1410), and output means, such as a monitor (1412). The computer system (1400) is connected to a local area network (LAN) or a wide area network (e.g., the Internet) (1414) via a network interface connection (not shown). Those skilled in the art will appreciate that these input and output means may take other forms.

Further, those skilled in the art will appreciate that one or more elements of the aforementioned computer system may be located at a remote location and connected to the other elements over a network. Further, the HEM for a reservoir field may be implemented on a distributed system having a plurality of nodes, where each portion of the HEM for a reservoir field may be located on a different node within the distributed system. In one embodiment, the node corresponds to a computer system. Alternatively, the node may correspond to a processor with associated physical memory. The node may alternatively correspond to a processor with shared memory and/or resources. Further, software instructions to perform embodiments of the HEM for a reservoir field may be stored on a computer readable medium such as a compact disc (CD), a diskette, a tape, or any other physical computer readable storage device.

While the HEM for a reservoir field has been described with respect to a limited number of embodiments, those skilled in the art, having benefit of this disclosure, will appreciate that other embodiments may be devised which do not depart from the scope of the HEM for a reservoir field as disclosed herein. Accordingly, the scope of the HEM for a reservoir field should be limited only by the attached claims.

What is claimed is:

1. A method for creating a heterogeneous earth model (HEM) of rock units present in a reservoir field, comprising:
generating using a computer a plurality of wellsite models for a plurality of wellsites of the reservoir field based at least on cluster analysis and cluster tagging performed on log data of the plurality of wellsites;
generating a reference model from the plurality of wellsite models, wherein cluster tagging errors of the plurality of wellsite models is minimized to obtain the reference model;
constructing a contour plot of the cluster tagging errors on a per-cluster basis in the reservoir field;
identifying at least one well location and associated core depth interval based on the contour plot for obtaining additional sampling results; and
updating the reference model based on the additional sampling results obtained from the at least one well location and associated core depth interval to create the HEM.

2. The method of claim 1, further comprising:
establishing a relationship between log measurements conducted on a first horizontal well of the plurality of wellsites and a cluster zonation of rock units of the reference model, wherein the reference model is further generated using a portion of the plurality of wellsite models corresponding to vertical wells; and
updating the reference model based on applying the relationship to a second horizontal well of the plurality of wellsites.

3. The method of claim 1, further comprising:
obtaining regional-scale data of the reservoir field comprising at least one selected from a group consisting of seismic data, gravity data, and electromagnetic data;
correlating the regional-scale data to generate correlated regional-scale data based on the plurality of wellsite models; and
updating the HEM to predict rock cluster units in-between the plurality of wellsites based on interpolation among the plurality of wellsite models using the correlated regional-scale data.

4. The method of claim 1, further comprising:
obtaining well-scale data from a plurality of horizontal wells and a plurality of inclined wells of the reservoir field; and
updating the HEM to predict rock cluster units in-between the plurality of wellsites based on interpolation among the plurality of wellsite models using the well-scale data.

5. The method of claim 1, further comprising:
updating the HEM to predict cluster units in-between the plurality of wellsites based on interpolation among the plurality of wellsite models using at least one selected from a group consisting of regional-scale data and well-scale data,
wherein the regional-scale data comprises at least one selected from a group consisting of seismic data, gravity data, and electromagnetic data, wherein the well-scale data is obtained from at least one selected from a group consisting of a horizontal well and an inclined well of the plurality of wellsites; and populating the HEM with core measured material properties comprising at least one selected from a group consisting of a reservoir property, a geophysical property, a geomechanical property, and a geochemical property.

6. The method of claim 5, further comprising:

constructing a volumetric representation of distribution and variability of the core measured material properties for the reservoir field using the HEM;

presenting the volumetric representation in a three-dimensional (3D) color display; and identifying at least one section from the 3D color display to estimate at least one selected from a group consisting of reservoir quality, completion quality, and fluid sensitivity.

7. The method of claim 5, further comprising:

constructing a volumetric representation of distribution and variability of the core measured material properties for the reservoir field using the HEM, wherein the distribution and variability of the core measured material properties are obtained from at least one selected from a group consisting of discrete measured rock properties on plugs, continuous measurements on core, and log-based predictions based on discrete or continuous core measurements;

constructing a contour representation from the volumetric representation;

presenting the contour representation in a two-dimensional (2D) color display; and identifying at least one section from the 2D color display to estimate at least one selected from a group consisting of reservoir quality, completion quality, and fluid sensitivity.

8. The method of claim 5, further comprising:

performing hydraulic fracturing simulation for a target reservoir region identified using the HEM;

determining a completion quality index based on a ratio of reservoir thickness to fracture height in the target reservoir region, wherein the fracture height is obtained from the hydraulic fracturing simulation;

constructing a contour representation of the completion quality index; and presenting the contour representation in a graphical color display to a user.

9. The method of claim 5, further comprising:

constructing a volumetric representation of distribution and variability of the core measured material properties for the reservoir field using the HEM;

identifying at least one section from a color display of the volumetric representation to generate an estimate of at least one selected from a group consisting of reservoir quality, completion quality, and fluid sensitivity;

identifying at least one zone of the reservoir field based on the estimate; and evaluating thickness of producible reserve and height growth containment to hydraulic fracture propagation for the zone of the reservoir field.

10. The method of claim 9, wherein the at least one zone is identified based on high reservoir quality and high completion quality for indicating high productivity potential.

11. The method of claim 9, wherein the at least one zone is identified based on poor reservoir quality and high completion quality for indicating no productivity potential.

12. The method of claim 9, wherein the at least one zone is identified based on poor reservoir quality and poor completion quality for indicating no productivity potential.

13. The method of claim 9, wherein the at least one zone is identified based on good reservoir quality and poor completion quality for indicating poor productivity potential.

14. The method of claim 9, wherein the at least one zone is identified based on high reservoir quality and poor completion quality for indicating a requirement for a different completion strategy.

15. The method of claim 5, further comprising:

calibrating the HEM based on field mechanical failure data of the plurality of wellsites to generate a calibrated HEM; and predicting mechanical stability of an arbitrary well path based on the calibrated HEM.

16. The method of claim 15, further comprising:

calculating a hydraulic fracturing potential of at least one of the plurality of wellsites based on the calibrated HEM; and determining a hydraulic fracturing solution for the reservoir field based on the hydraulic fracturing potential of the at least one of the plurality of wellsites, wherein hydraulic fracturing potential of the at least one of the plurality of wellsites is calculated based on superposing curvature analysis to the calibrated HEM.

17. The method of claim 5, further comprising:

providing at least one input to operations of the reservoir field based on the HEM, wherein the at least one input comprises at least one selected from a group consisting of landing horizon and well path trajectory for intersecting desirable rock cluster units, stability evaluation along a proposed well path and trajectory, perforation strategy and interval, in-situ stress assessment, large scale evaluation for coupled modeling, and stress redistribution and mechanical interference among the plurality of wellsites.

18. A non-transitory computer readable medium storing instructions for creating a heterogeneous earth model (HEM) of a reservoir field, the instructions when executed by a computer perform a method, the method comprising:

generating a plurality of wellsite models for a plurality of wellsites of the reservoir field based at least on cluster analysis and cluster tagging performed on log data of the plurality of wellsites;

generating a reference model from the plurality of wellsite models, wherein cluster tagging errors of the plurality of wellsite models is minimized to obtain the reference model;

constructing a contour plot of the cluster tagging errors on a per-cluster basis in the reservoir field;

identifying at least one well location and associated core depth interval based on the contour plot for obtaining additional sampling results; and updating the reference model based on the additional sampling results obtained from the at least one well location and associated core depth interval to create the HEM.

19. The computer readable medium of claim 18, the method further comprising:

establishing a relationship between log measurements conducted on a first horizontal well of the plurality of wellsites and a cluster zonation of the reference model, wherein the reference model is further generated using a portion of the plurality of wellsite models corresponding to vertical wells; and updating the reference model based on applying the relationship to a second horizontal well of the plurality of wellsites.

20. The computer readable medium of claim 18, the instructions when executed by the computer further comprising functionality for:
   obtaining regional-scale data of the reservoir field comprising at least one selected from a group consisting of seismic data, gravity data, and electromagnetic data;
   correlating the regional-scale data to generate correlated regional-scale data based on the plurality of wellsite models; and
   updating the HEM to predict rock cluster units in-between the plurality of wellsites based on interpolation among the plurality of wellsite models using the correlated regional-scale data.

21. The computer readable medium of claim 18, the instructions when executed by the computer further comprising functionality for:
   obtaining well-scale data from a plurality of horizontal wells and a plurality of inclined wells of the reservoir field; and
   updating the HEM to predict rock cluster units in-between the plurality of wellsites based on interpolation among the plurality of wellsite models using the well-scale data.

22. A computer system for creating a heterogeneous earth model (HEM) of a reservoir field, comprising:
   a processor;
   memory storing instructions which when executed by the processor perform:
      obtaining log data from a plurality of wellsites of the reservoir field;
      generating a plurality of wellsite models for the plurality of wellsites based at least on cluster analysis and cluster tagging performed on log data of the plurality of wellsites;
      generating a reference model from the plurality of wellsite models, wherein cluster tagging errors of the plurality of wellsite models is minimized to obtain the reference model;
      constructing a contour plot of the cluster tagging errors on a per-cluster basis in the reservoir field;
      identifying at least one well location and associated core depth interval based on the contour plot for obtaining additional sampling results;
      updating the reference model based on the additional sampling results obtained from the at least one well location and associated core depth interval to create the HEM; and
      constructing a volumetric representation of distribution and variability of the core measured material properties for the reservoir field using the HEM.

23. The computer system of claim 22, further comprising:
   a three-dimensional (3D) color display,
   wherein the instructions when executed by the processor further comprises functionality for presenting the volumetric representation in the 3D color display.

24. The computer system of claim 22, further comprising:
   a two-dimensional (2D) color display,
   wherein the instructions when executed by the processor further comprises functionality for presenting the volumetric representation in the 2D color display.

* * * * *